(12) United States Patent
Nomura et al.

(10) Patent No.: US 7,440,002 B2
(45) Date of Patent: Oct. 21, 2008

(54) OPTICAL SCANNING APPARATUS AND IMAGE FORMING APPARATUS

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 305 days.

(21) Appl. No.: 10/941,309

(22) Filed: Sep. 15, 2004

(65) Prior Publication Data

US 2005/0088512 A1    Apr. 28, 2005

(30) Foreign Application Priority Data

Sep. 17, 2003    (JP) .............. 2003-324196
Sep. 29, 2003    (JP) .............. 2003-336829

(51) Int. Cl.
*G02B 26/10* (2006.01)
*B41J 2/44* (2006.01)

(52) U.S. Cl. ..................................... 347/260

(58) Field of Classification Search ......... 347/258–260, 347/256, 241, 243; 359/198–199, 212–214, 359/222–225, 196–197, 201, 203
See application file for complete search history.

(56) References Cited

U.S. PATENT DOCUMENTS

| | | | | | |
|---|---|---|---|---|---|
| 3,612,642 | A | * | 10/1971 | Dostal | 359/201 |
| 3,799,644 | A | * | 3/1974 | Street | 359/221 |
| 4,251,125 | A | | 2/1981 | Minoura et al. | |
| 4,299,438 | A | * | 11/1981 | Minoura | 359/205 |
| 4,902,893 | A | * | 2/1990 | Burrer | 250/334 |
| 5,136,415 | A | * | 8/1992 | Bean | 359/213 |
| 6,198,563 | B1 | * | 3/2001 | Atsuumi | 359/208 |
| 6,198,565 | B1 | * | 3/2001 | Iseki et al. | 359/224 |
| 2003/0012489 | A1 | * | 1/2003 | Oikawa | 385/18 |
| 2003/0021497 | A1 | | 1/2003 | Kandori et al. | |
| 2003/0072066 | A1 | | 4/2003 | Hayashi et al. | |
| 2004/0036936 | A1 | * | 2/2004 | Nakajima et al. | 359/204 |

FOREIGN PATENT DOCUMENTS

| | | |
|---|---|---|
| JP | 53-097447 | 8/1978 |
| JP | 2003-098459 | 4/2003 |
| JP | 2003-131151 | 5/2003 |

OTHER PUBLICATIONS

R.A. Lampitt; *Network Analysis for Telecommunications and Electronics*; Iliffe Books Ltd, London1965; pp. 120-122.
Masaaki Mitani; *Desing of Digital Filters*; Shokodo Co. Ltd.; Japan 1996; p. 44.

* cited by examiner

*Primary Examiner*—Huan H Tran
(74) *Attorney, Agent, or Firm*—Hogan & Hartson LLP

(57) ABSTRACT

A mirror driver drives deflection mirror surfaces into a pivoting action at a frequency belonging to a first drive frequency band in which the high-frequency side of a first resonance frequency band partially overlaps the low-frequency side of a second resonance frequency band, so that the deflection mirror surfaces deflect a light beam. Hence, the deflection angles of light beams change, while canceling out each other the changes of the deflection angles of the light beams deflected by the deflection mirror surfaces owing to changes of resonance characteristics. Because of this, even when the resonance characteristics change, it is possible to stabilize the deflection angle of the light beam deflected by the first deflection mirror surface and further deflected by the second deflection mirror surface.

25 Claims, 20 Drawing Sheets

FIG. 9A: WHERE THERE IS SHIFT TOWARD THE HIGH-FREQUENCY SIDE
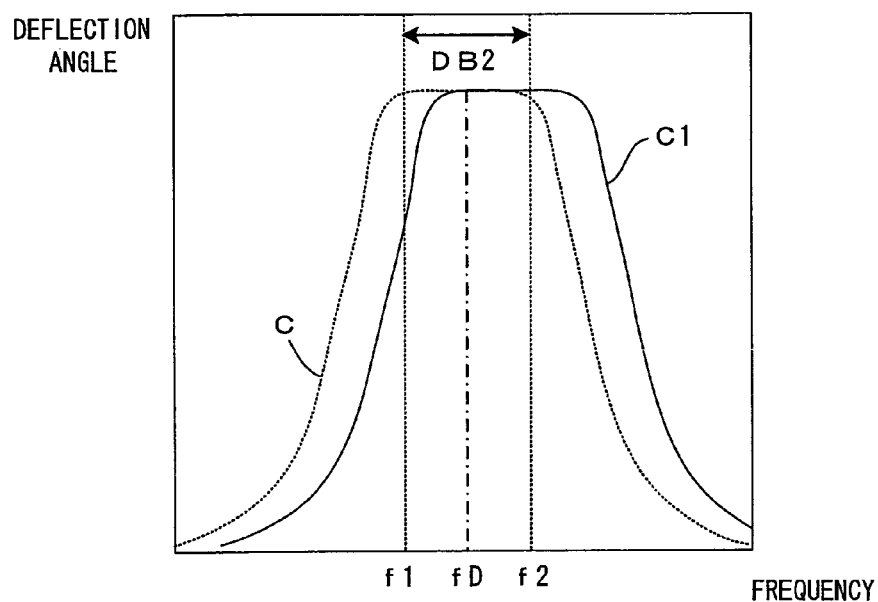
FIG. 9B: WHERE THERE IS SHIFT TOWARD THE LOW-FREQUENCY SIDE
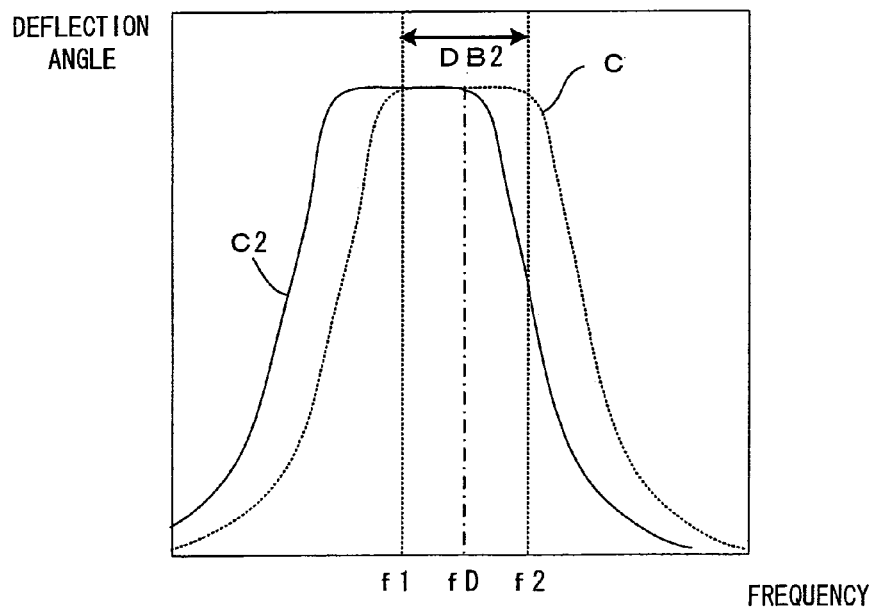

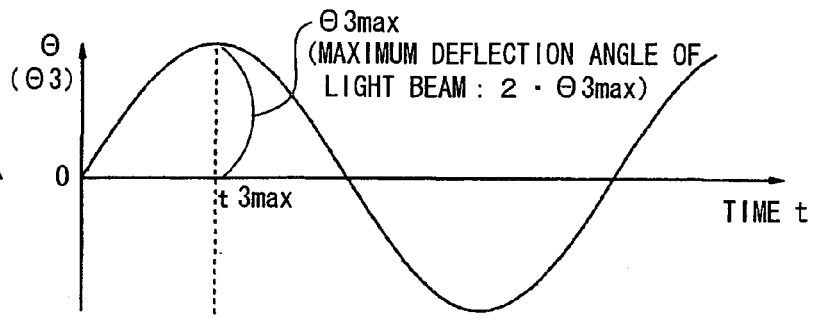
FIG. 20A REFERENCE DEFLECTION MIRROR SURFACE (THIRD DEFLECTION MIRROR SURFACE)
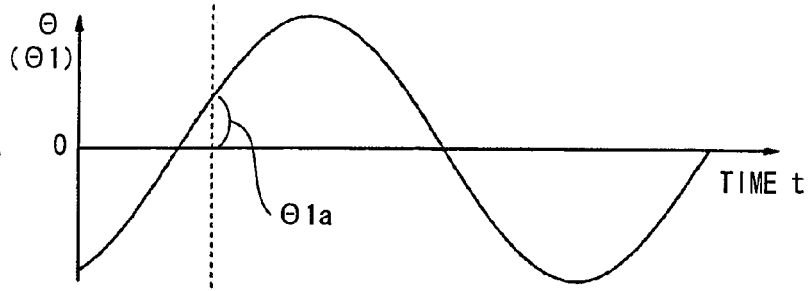
FIG. 20B FIRST DEFLECTION MIRROR SURFACE
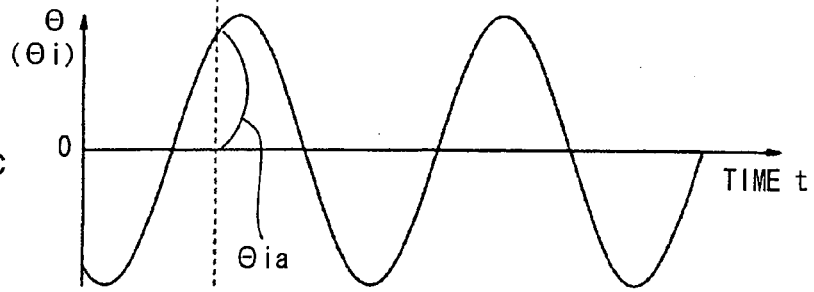
FIG. 20C i-TH DEFLECTION MIRROR SURFACE

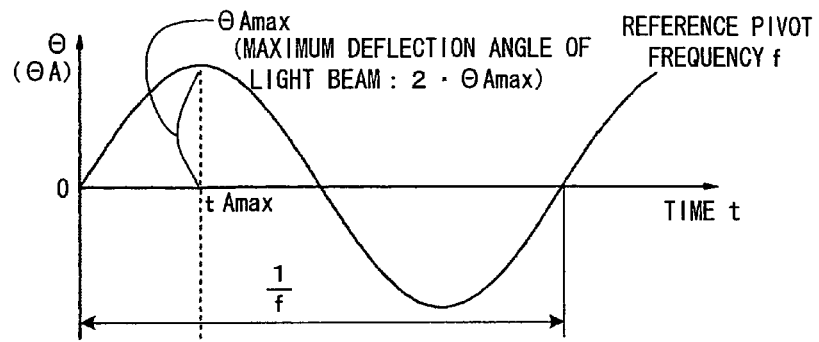
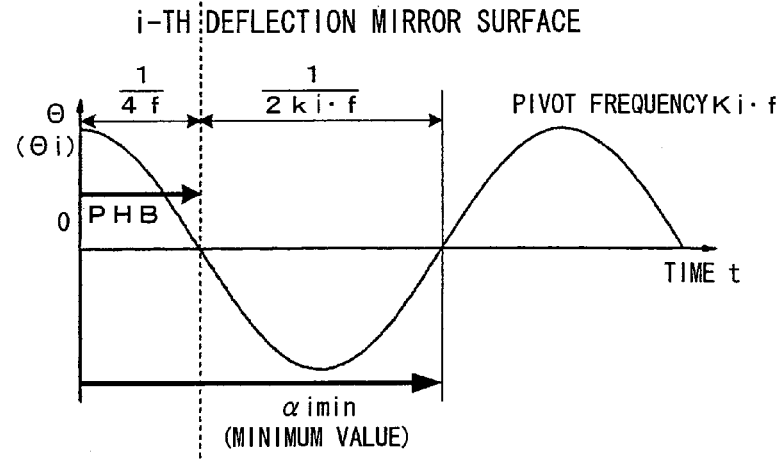
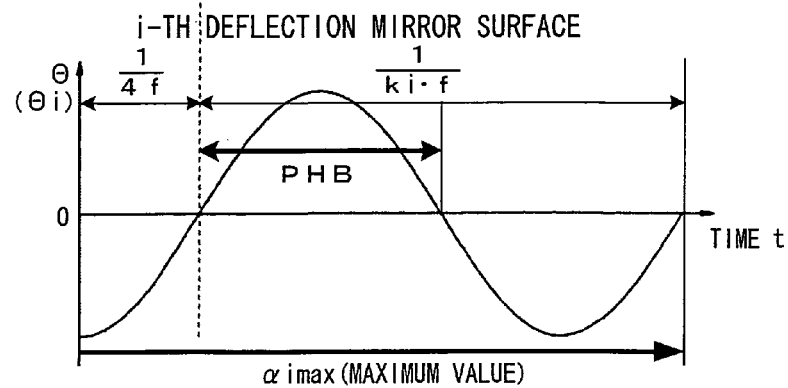

OPTICAL SCANNING APPARATUS AND IMAGE FORMING APPARATUS

CROSS REFERENCE TO RELATED APPLICATION

The disclosure of Japanese Patent Applications enumerated below including specification, drawings and claims is incorporated herein by reference in its entirety:
No.2003-324196 filed Sep. 17, 2003; and
No.2003-336829 filed Sep. 29, 2003.

BACKGROUND OF THE INVENTION

1. Field of the Invention

The present invention relates to an optical scanning apparatus in which a plurality of deflection mirror surfaces are used for scanning with a light beam, e.g., an optical scanning apparatus. In the apparatus, a light beam deflected by one deflection mirror surface is deflected further by another deflection mirror surface and the deflection angle of the light beam accordingly increases, and also to an image forming apparatus which comprises such an optical scanning apparatus.

2. Description of the Related Art

In an attempt to increase the deflection angle of a light beam, a conventional optical scanning apparatus for use within an image forming apparatus such as a laser beam printer, a copier machine and a facsimile machine in some cases employs a structure that two deflecting elements are disposed and a deflection mirror surface of each deflecting element deflects a light beam. For instance, in the optical scanning apparatus described in Japanese Patent Application Laid-Open Gazette No. S53-97447, a transmission optical system guides a light beam deflected by a first deflection mirror surface to a second deflection mirror surface, the second deflection mirror surface further deflects the light beam coming from the first deflection mirror surface, and the deflection angle of the light beam accordingly increases. The light beam emitted from the second deflection mirror surface is guided upon a surface-to-be-scanned through a scanning lens. Thus, the combination of the first and the second deflection mirror surfaces and the transmission optical system increases the deflection angle of the light beam.

Further, where vibration mirrors such as galvano-mirrors are used as the deflecting elements in the optical scanning apparatus above, a general approach to ensure vibrations at the maximum amplitude with minimum electric power is to apply a drive signal whose frequency matches with the resonance frequency of the vibration mirrors and to make the vibration mirrors resonate. As the vibration mirrors resonate, the vibration amplitude of the vibration mirrors is enhanced and the deflection angle of the light beam is increased.

SUMMARY OF THE INVENTION

By the way, the resonance frequency of the vibration mirrors varies as the temperature in an environment around the vibration mirrors changes. This sometimes leads to the following problem. That is, since the vibration mirrors are driven by the drive signal having a constant frequency, when the resonance frequency coincides with the drive frequency, the vibration amplitude of the vibration mirrors becomes large. However, when the resonance frequency changes in accordance with a temperature change as described above, the resonance frequency becomes different from the drive frequency and the vibration amplitude changes. Thus, there is a problem that since the vibration amplitude of the vibration mirrors does not stay stable when the temperature in an environment around the vibration mirrors changes, it is not possible to deflect a light beam stably.

Further, in the optical scanning apparatus above, the transmission optical system guides the light beam deflected by the first deflection mirror surface toward the second deflection mirror surface, the second deflection mirror surface further deflects the light beam from the first deflection mirror surface, and the deflection angle of the light beam accordingly increases. Because of this, where vibration mirrors such as galvano-mirrors are used as the deflecting elements of the optical scanning apparatus, it is necessary to sufficiently adjust the vibration frequency and the phase of each deflecting element such that the deflection angle of the light beam emitted from the second deflection mirror surface toward the surface-to-be-scanned will increase beyond the deflection angle of the light beam deflected by the first deflection mirror surface.

Despite this, since the optical scanning apparatus above does not have enough countermeasures on this, the following problem may occur. That is, depending upon how the vibration frequency and the phase of each deflecting element are set, the second deflection mirror surface could deflect the light beam so as to reduce the deflection angle of the light beam deflected by the first deflection mirror surface. In short, it is sometimes impossible to ensure that the deflection angle of the light beam emitted from the second deflection mirror surface toward the surface-to-be-scanned becomes larger than the maximum deflection angle of the light beam deflected by the first deflection mirror surface.

It is a principal object of the present invention is to provide an optical scanning apparatus which secures a necessary deflection angle stably and provide an image forming apparatus which comprises such an optical scanning apparatus.

It is another object of the present invention is to provide an optical scanning apparatus which stably deflects a light beam even when the temperature in an environment around the optical scanning apparatus changes, and provide an image forming apparatus which comprises such an optical scanning apparatus.

It is a further object of the present invention is to provide an optical scanning apparatus which securely attains a larger deflection angle of a light beam than the maximum deflection angle of a light beam deflected by a reference deflection mirror surface, and provide an image forming apparatus which comprises such an optical scanning apparatus.

According to a first aspect of the present invention, two deflection mirror surfaces are disposed for free pivoting about main scanning/deflection axes which are independent of each other in order to deflect a light beam from a light source. The first deflection mirror surface is structured so that when driven to pivot in a predetermined first resonance frequency band, owing to resonance, the first deflection mirror surface deflects the light beam at a larger deflection angle than when driven to pivot at a frequency outside the first resonance frequency band. The second deflection mirror surface is structured so that when driven to pivot in a second resonance frequency band which partially overlaps the first resonance frequency band, owing to resonance, the second deflection mirror surface deflects the light beam at a larger deflection angle than when driven to pivot at a frequency outside the second resonance frequency band. A mirror driver drives the first and the second deflection mirror surfaces and makes the first and the second deflection mirror surfaces pivot at a frequency which belongs to a first drive frequency band in which the first resonance frequency band and the second resonance frequency band partially overlap each other.

According to a second aspect of the present invention, a first through an N-th deflection mirror surfaces (where N is a natural number satisfying N≧2) are disposed for free pivoting about main scanning/deflection axes which are independent of each other in order to deflect a light beam from a light source. In the apparatus, the light beam from the light source impinges upon the first deflection mirror surface, and after deflected at least once or more times by each one of the first through the N-th deflection mirror surfaces, the light beam is emitted from one of the first through the N-th deflection mirror surfaces toward a surface-to-be-scanned. With one of the first through the N-th deflection mirror surfaces serving as a reference deflection mirror surface, the mirror driver drives the first through the N-th deflection mirror surfaces to pivot such that each deflection mirror surface except for the reference deflection mirror surface deflects the light beam in a predetermined direction when the deflection angle of the light beam deflected by the reference deflection mirror surface in the predetermined direction becomes the maximum deflection angle.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 9A and 9B are schematic drawings which show a change of the resonance characteristic of the deflecting element which is one of the components forming the exposure unit;

FIGS. 20A through 20C are schematic drawings which show conditions which the optical scanning apparatus shown in FIG. 19 needs satisfy in order to increase the deflection angle of a light beam;

FIGS. 21A through 21C are schematic drawings which show the basis of a phase time difference which satisfy the conditions which are shown in FIGS. 20A through 20C.

DETAILED DESCRIPTION OF THE PREFERRED EMBODIMENTS

First Embodiment

Figure 1:
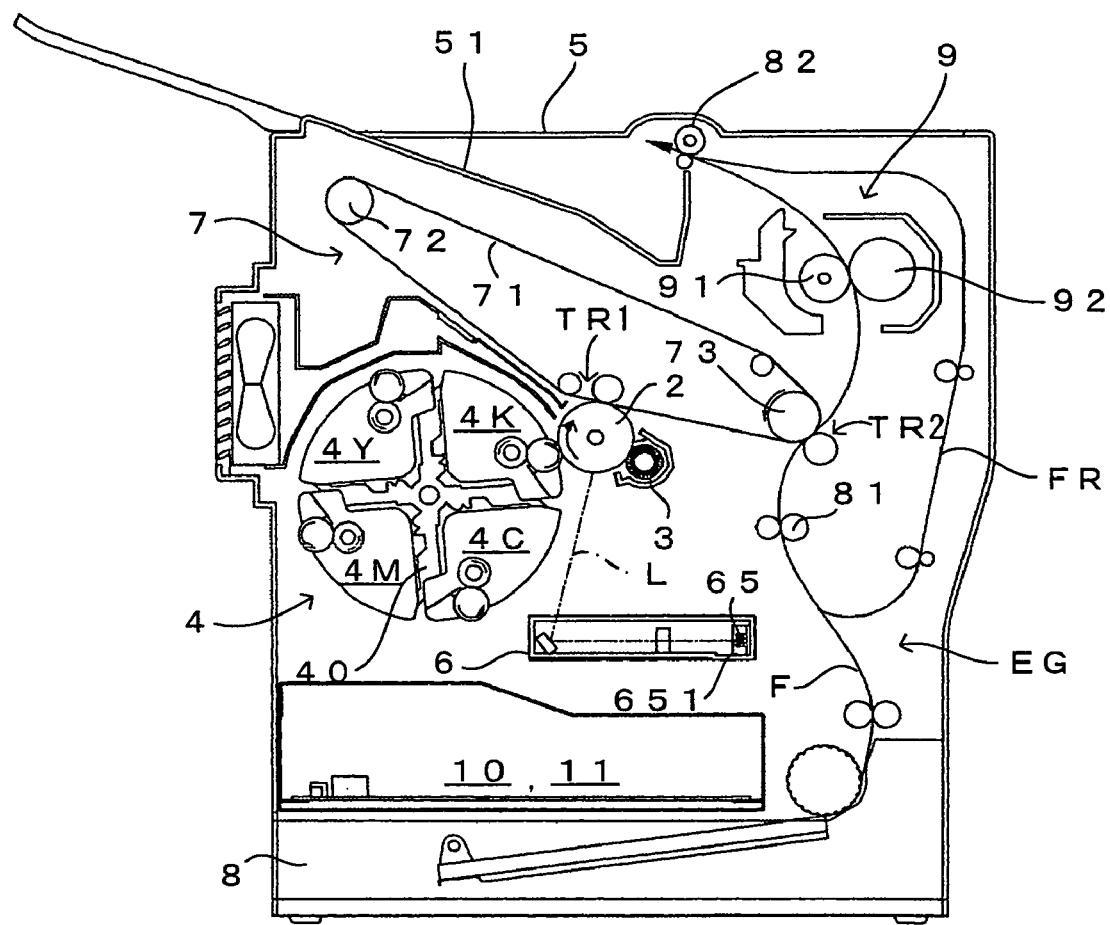
FIG. 1 is a drawing of an image forming apparatus equipped with an exposure unit which is a first embodiment of an optical scanning apparatus according to the present invention.
Figure 2:
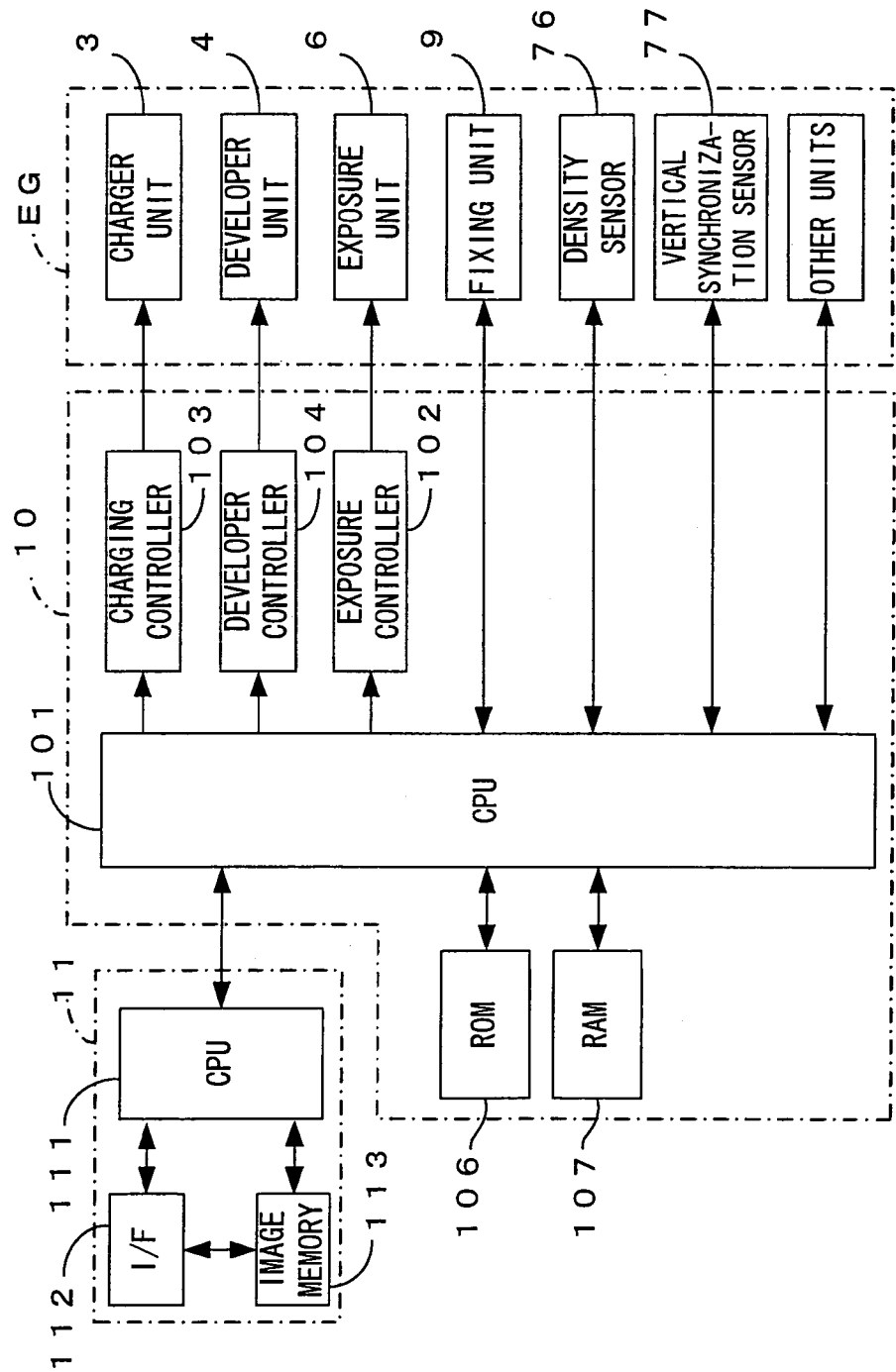
FIG. 2 is a block diagram showing the electric structure of the image forming apparatus which is shown in FIG. 6.

FIG. 1 is a drawing of an image forming apparatus equipped with an exposure unit which is a first embodiment of an optical scanning apparatus according to the present invention. FIG. 2 is a block diagram showing the electric structure of the image forming apparatus which is shown in FIG. 1. This image forming apparatus is a color printer of the so-called 4-cycle method. In this image forming apparatus, when a print command is fed to a main controller 11 from an external apparatus such as a host computer in response to an image formation request from a user, an engine controller 10 controls respective portions of an engine part EG in accordance with the print command from a CPU 111 of the main controller 11, and an image which corresponds to the print command is formed on a sheet which may be a copy paper, a transfer paper, a plain paper or a transparency for an overhead projector.

In the engine part EG; a photosensitive member 2 (which corresponds to the "latent image carrier" of the present invention) is disposed so that the photosensitive member 2 can freely rotate in the arrow direction (sub scanning direction) shown in FIG. 1. Around the photosensitive member 2, a charger unit 3, a rotary developer unit 4 and a cleaner (not shown) are disposed along the direction of rotations of the photosensitive member 2. A charging controller 103 is electrically connected with the charger unit 3, for application of a predetermined charging bias. The bias application uniformly charges an outer circumferential surface of the photosensitive member 2 to a predetermined surface potential. The photosensitive member 2, the charger unit 3 and the cleaner form one integrated photosensitive member cartridge which can be freely attached to and detached from a main section 5 of the apparatus as one integrated unit.

An exposure unit 6 which corresponds to the optical scanning apparatus of the present invention emits a light beam L toward the outer circumferential surface of the photosensitive member 2 thus charged by the charger unit 3. The exposure unit 6 exposes a surface (which corresponds to the "surface-to-be-scanned" of the present invention) of the photosensitive member 2 with the light beam L in accordance with an image signal fed from the external apparatus, whereby an electrostatic latent image which corresponds to the image signal is formed. The structure and operations of the exposure unit 6 will be described in detail later.

The developer unit 4 develops thus formed electrostatic latent image with toner. In other words, in this embodiment, the developer unit 4 comprises a support frame 40 which is axially disposed for free rotations, and also a yellow developer 4Y, a magenta developer 4M, a cyan developer 4C and a black developer 4K which house toner of the respective colors and are formed as cartridges which are freely attachable to and detachable from the support frame 40. The developer unit 4 is driven into rotations in response to a control command given from a developer controller 104 of the engine controller 10. When the developers 4Y, 4C, 4M and 4K are selectively positioned at a predetermined developing position which abuts on the photosensitive member 2 or is faced with the photosensitive member 2 over a predetermined gap, toner of the color corresponding to the selected developer is supplied onto the surface of the photosensitive member 2 by a developer roller which is disposed to the selected developer and carries the toner of the selected color. As a result, the electrostatic latent image on the photosensitive member 2 is visualized in the selected toner color.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72, 73, etc., and a driver (not shown) which drives the roller 73 into rotations to thereby rotate the intermediate transfer belt 71 in a predetermined rotation direction.

Further, there are a transfer belt cleaner (not shown), a density sensor 76 (FIG. 2) and a vertical synchronization sensor 77 (FIG. 2) in the vicinity of the roller 72. Of these, the density sensor 76 is disposed facing a surface of the intermediate transfer belt 71 and measures the optical density of a patch image formed on an outer circumferential surface of the intermediate transfer belt 71. Meanwhile, the vertical synchronization sensor 77 is a sensor which detects a reference position of the intermediate transfer belt 71, and serves as a vertical synchronization sensor for obtaining a synchronizing signal outputted in relation to rotations of the intermediate transfer belt 71 in the sub scanning direction, namely, a vertical synchronizing signal Vsync. In this apparatus, for the purpose of aligning the timing at which the respective portions operate and accurately overlaying toner images of the respective colors on top of each other, the operations of the respective portions of the apparatus are controlled based on the vertical synchronizing signal Vsync.

For transfer of color images on sheets, the toner images of the respective colors formed on the photosensitive member 2 are overlaid each other on the intermediate transfer belt 71, thereby forming color images which will then be secondarily transferred onto sheets taken out one by one from a cassette 8 and transported on a transportation path F to a secondary transfer region TR2.

At this stage, in order to properly transfer the images carried by the intermediate transfer belt 71 onto a sheet at a predetermined position, the timing of feeding the sheet to the secondary transfer region TR2 is controlled. To be specific, there is a gate roller 81 disposed in front of the secondary transfer region TR2 on the transportation path F, and as the gate roller 81 rotates in synchronization to the timing of rotations of the intermediate transfer belt 71, the sheet is fed into the secondary transfer region TR2 at predetermined timing.

Further, the sheet now bearing the color image is transported to a discharge tray part 51, which is disposed to a top surface portion of the main section 5 of the apparatus, through a fixing unit 9 and a discharge roller 82. When images are to be formed on the both surfaces of a sheet, the discharge roller 82 moves the sheet seating an image on its one surface in the manner above in a switch back motion. The sheet is therefore transported along a reverse transportation path FR. While the sheet is returned back to the transportation path F again before arriving at the gate roller 81, the surface of the sheet which abuts on the intermediate transfer belt 71 in the secondary transfer region TR2 and is to receive a transferred image is, at this stage, the opposite surface to the surface which already bears the image. In this fashion, it is possible to form images on the both surfaces of the sheet.

In FIG. 2, denoted at 113 is an image memory disposed in the main controller 11 for storage of image data fed from an external apparatus such as a host computer via an interface 112. Denoted at 106 is a ROM which stores a calculation program executed by a CPU 101, control data for control of the engine part EG, etc. Denoted at 107 is a RAM which temporarily stores a calculation result derived by the CPU 101, other data, etc.

Figure 3:
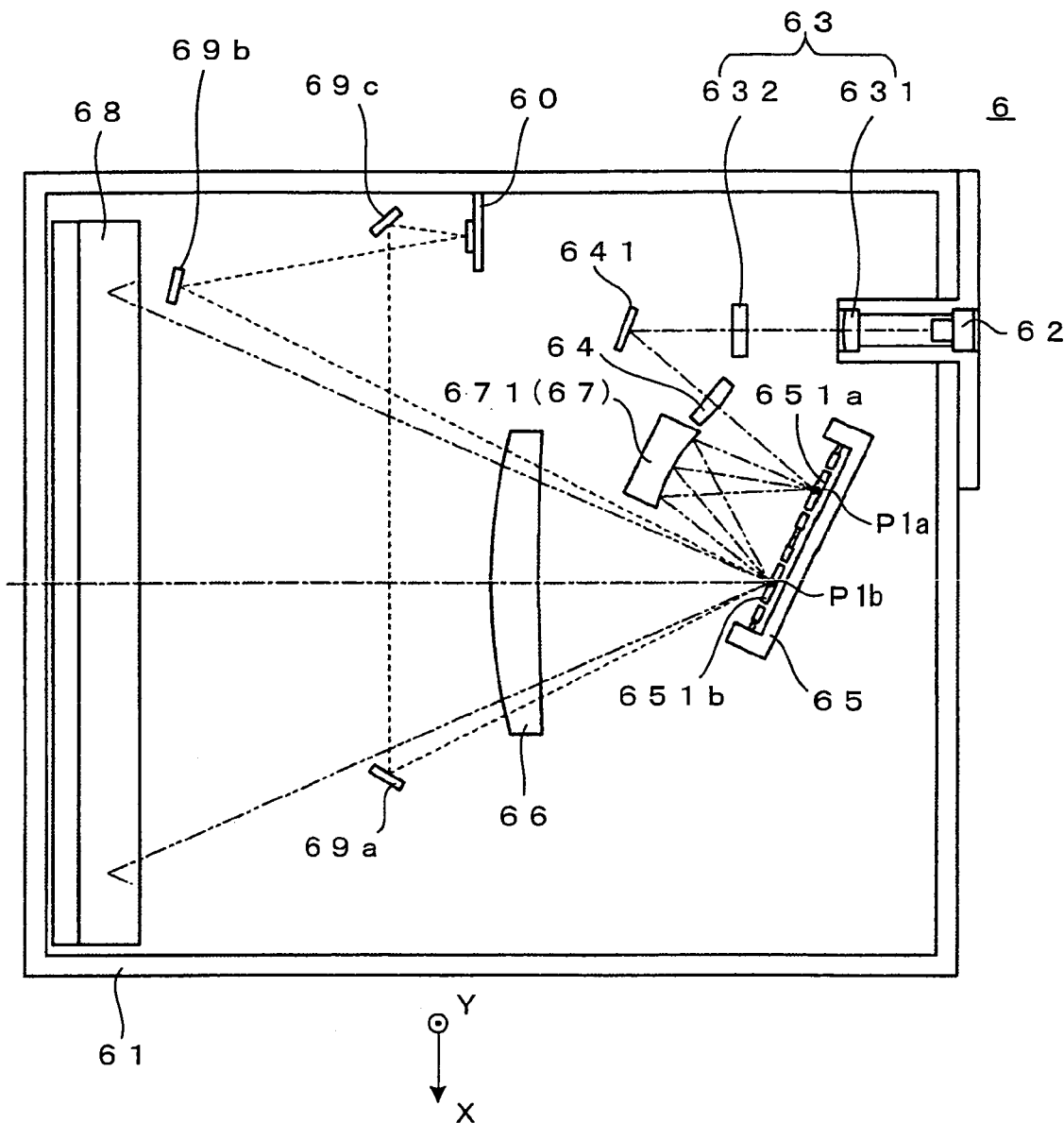
FIGS. 3 and 4 are main-scanning cross sectional views of the exposure unit which is the first embodiment of the optical scanning apparatus according to the present invention.
Figure 4:
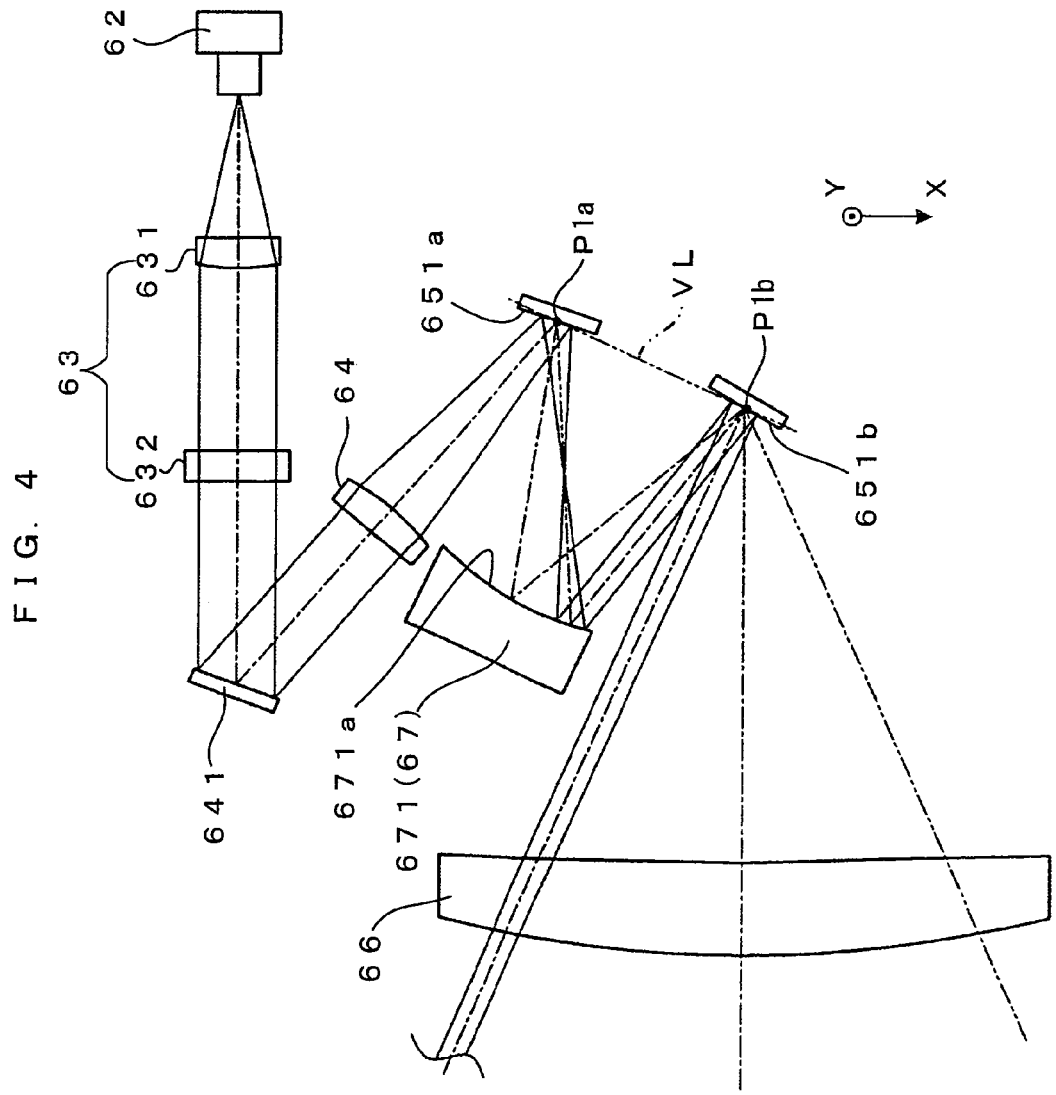
Figure 5:
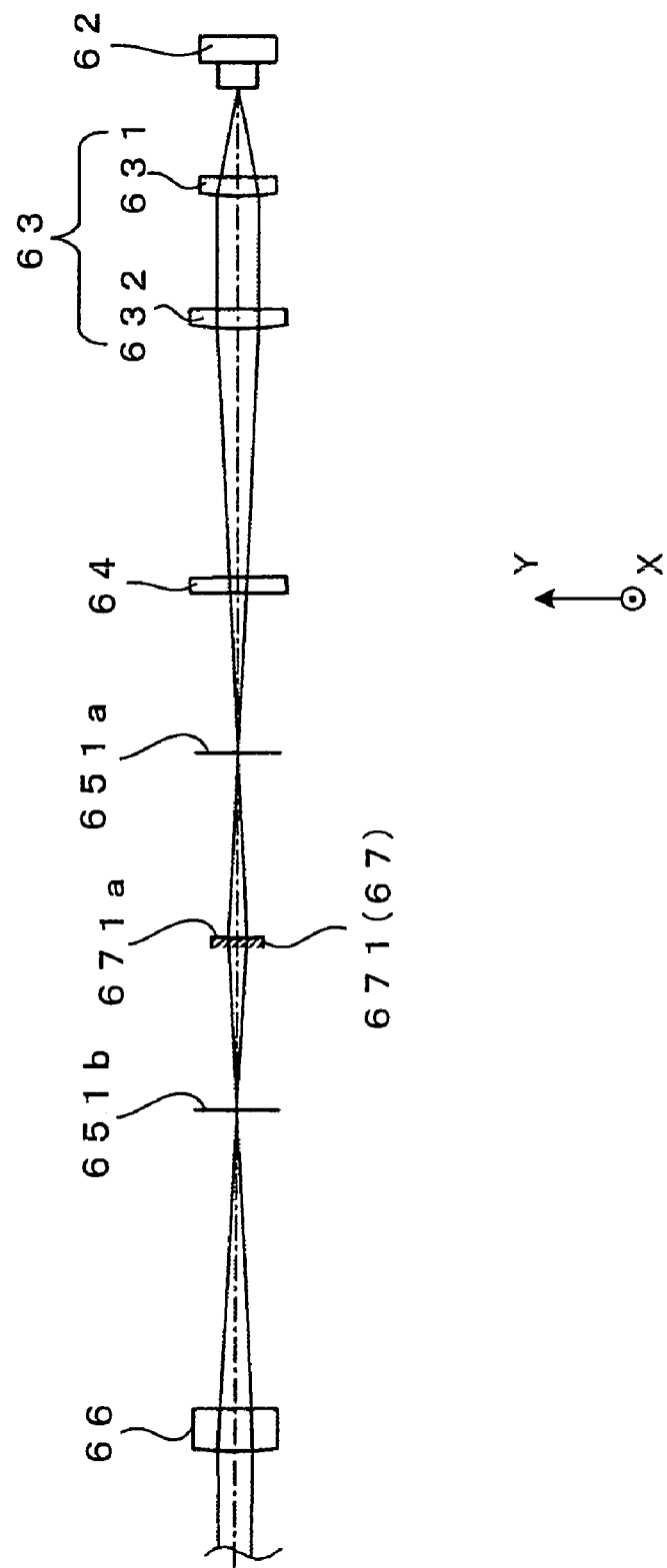
FIG. 5 is a sub-scanning cross sectional view of the optical scanning apparatus which is shown in FIGS. 3 and 4.
Figure 6:
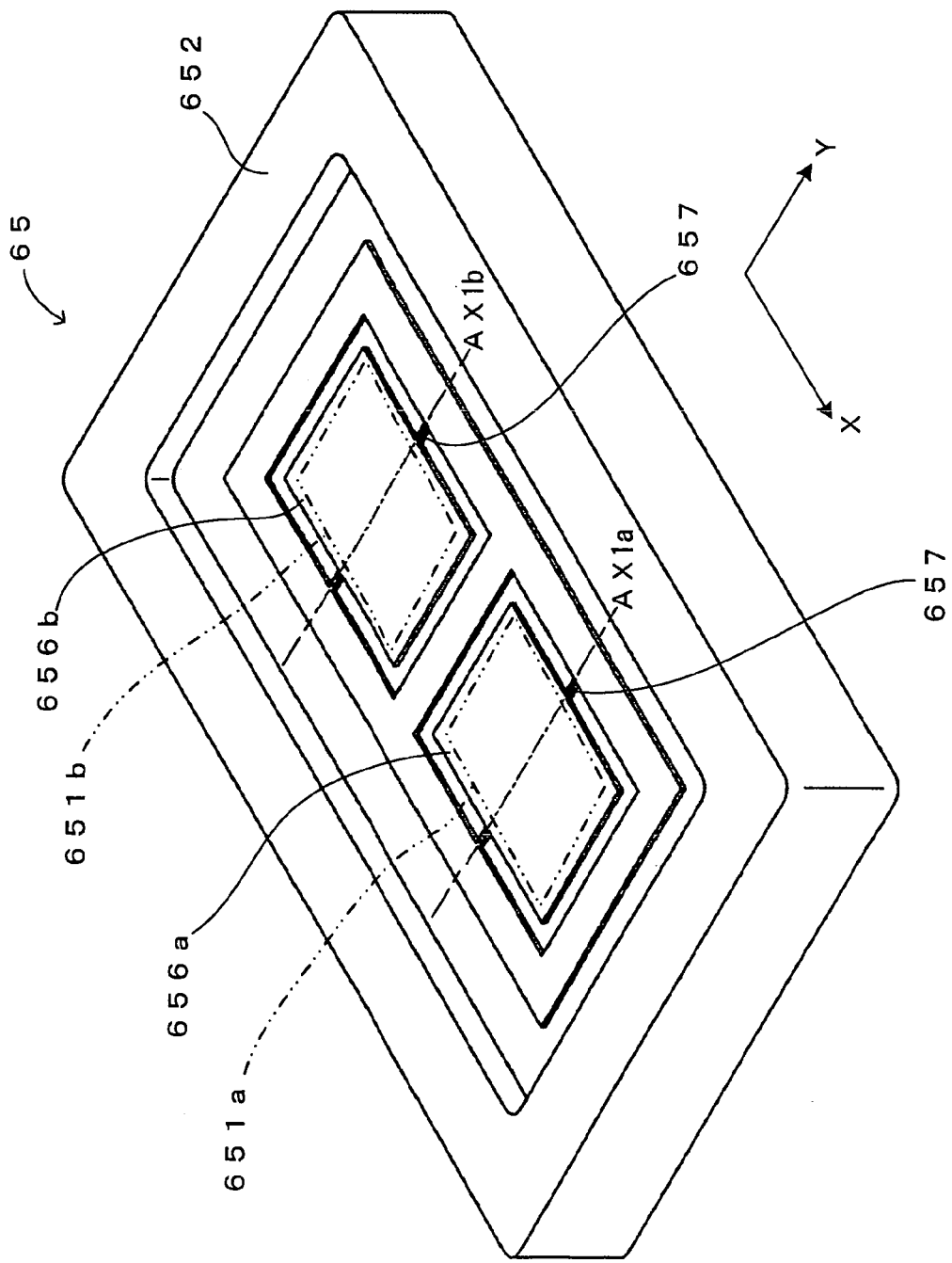
FIGS. 6 and 7 are drawings of a deflecting element which is one of components which form the exposure unit.
Figure 7:
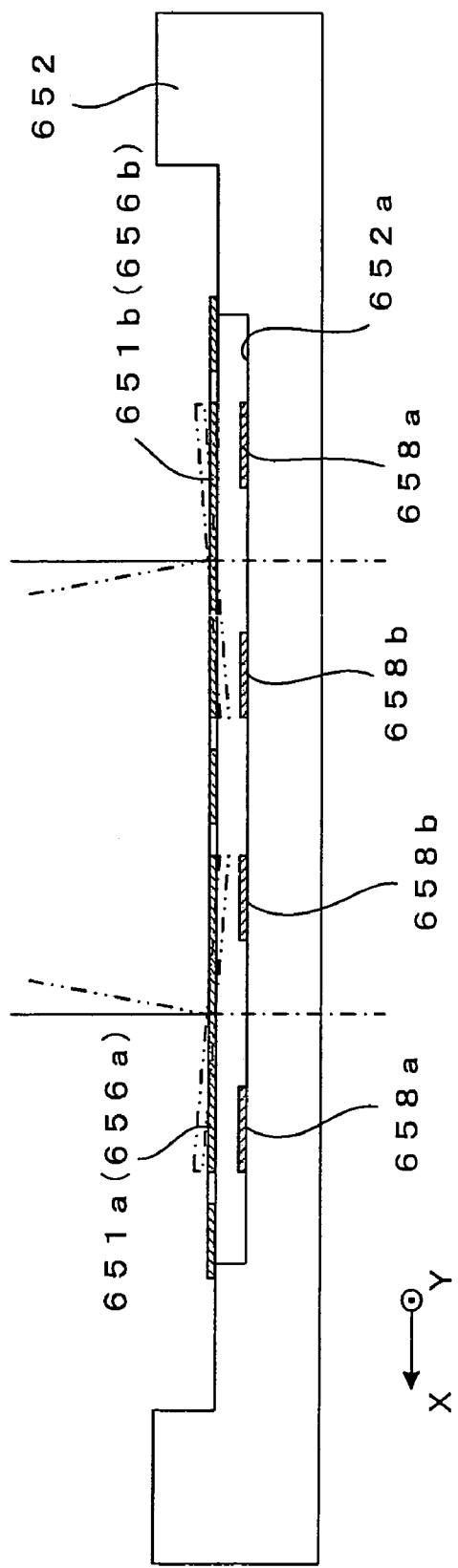
Figure 8:
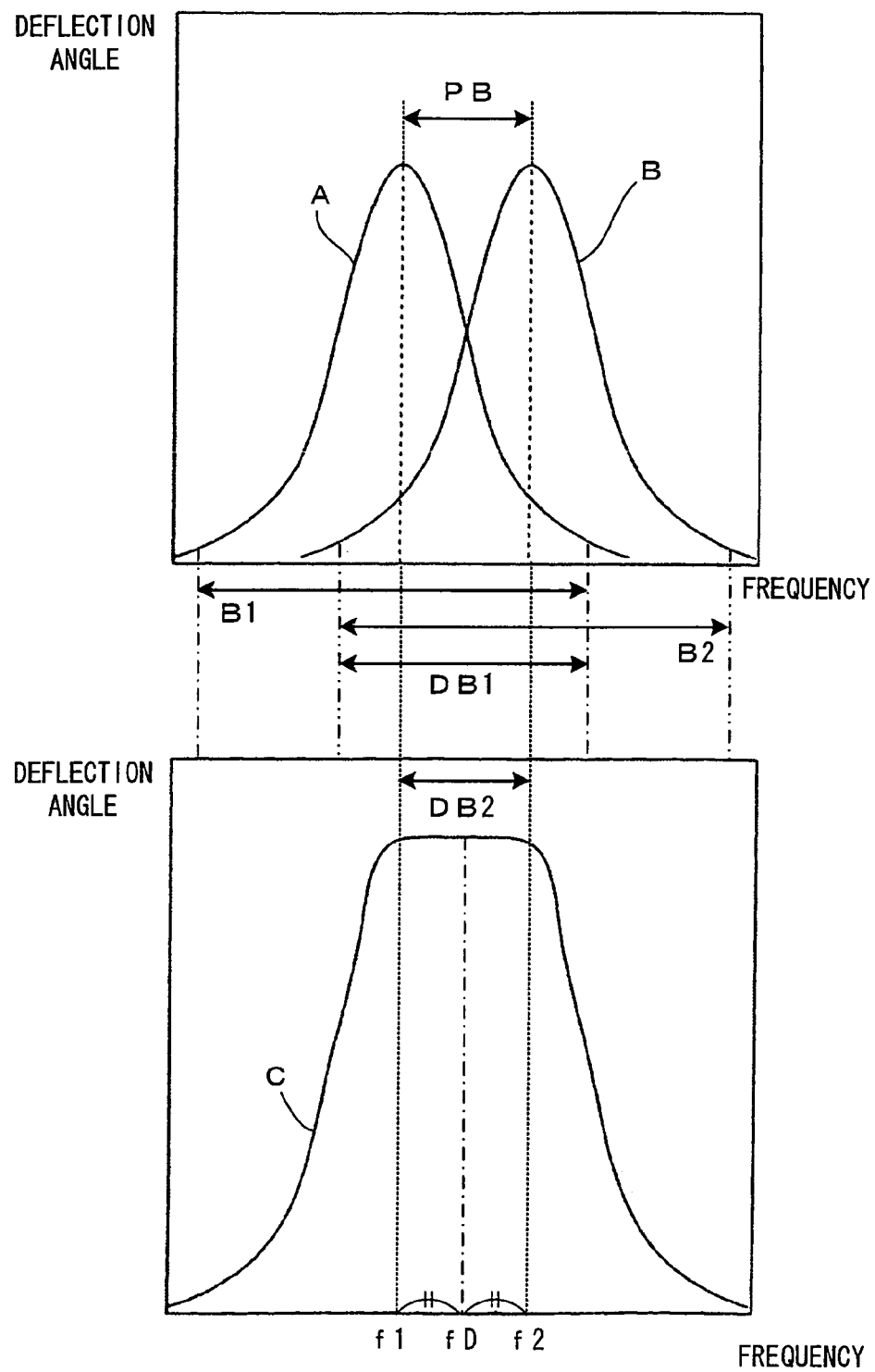
FIG. 8 is a schematic drawing which shows the resonance characteristics of the deflecting element which is one of the components forming the exposure unit.

FIGS. 3 and 4 are main-scanning cross sectional views showing the structure of the exposure unit (optical scanning apparatus) which is disposed in the image forming apparatus which is shown in FIG. 1. FIG. 5 is a sub-scanning cross sectional view showing the structure of the exposure unit (optical scanning apparatus) which is disposed in the image forming apparatus which is shown in FIG. 1. FIGS. 6 and 7 are drawings of a deflecting element which is one of components forming the exposure unit. FIG. 8 is a schematic drawing showing the resonance characteristics of the deflecting element shown in FIGS. 6 and 7, which are relationships between drive frequencies and the sizes of the deflection angle of a light beam. FIGS. 9A and 9B are schematic drawings which show a change of the deflection angle of a light beam in accordance with a change of the resonance characteristic which is shown in FIG. 8. The structure and operations of the exposure unit will now be described in detail with reference to these drawings.

The exposure unit 6 comprises an exposure housing 61. A single laser source 62 is fixed to the exposure housing 61, permitting emission of a light beam from the single laser source 62. The single laser source 62 is electrically connected with a light source driver (not shown) of an exposure controller 102. The light source driver controls ON and OFF of the laser source 62 in accordance with image data, and the laser source 62 emits a light beam modulated in accordance with the image data.

Further, to make the light beam from the single laser source 62 scan and expose the surface (not shown) of the photosensitive member 2, a collimator lens 631, a cylindrical lens 632, a deflecting element 65 which corresponds to the "deflector" of the present invention, a scanning lens 66 which corresponds to the "imaging element" of the present invention, a transmission optical system 67 and a return mirror 68 are disposed inside the exposure housing 61. In short, after shaped into collimated light of a proper size by the collimator lens 631, the light beam from the single laser source 62 impinges upon the cylindrical lens 632 which has power only along the sub scanning direction Y as shown in FIG. 5. Meanwhile, the light beam transmitted by the cylindrical lens 632 is returned by a return mirror 641 and then impinges upon a converging lens 64 which has power only along a main scanning direction X as shown in FIG. 4. As the cylindrical lens 632 is adjusted, the collimated light is imaged in the vicinity of a deflection mirror surface 651a of the deflecting element 65 in a sub scanning direction Y In this embodiment, the collimator lens 631 and the cylindrical lens 632 thus function as a beam shaper system 63 which shapes the light beam from the single laser source 62. The focal length of the converging lens 64 is longer than the surface-to-surface distance between this lens 64 and the first deflection mirror surface 651a. Hence, in the vicinity of the first deflection mirror surface 651a of the deflecting element 65, a line image extending in the main scanning direction X is formed.

The deflecting element 65 is made using a micro machining technique which is an application of semiconductor manufacturing techniques and which aims at forming an integrated micro machine on a semiconductor substrate. The deflecting element 65 is capable of deflecting a light beam reflected by the deflection mirror surfaces 651a and 651b in a main scanning direction X. To be more specific, the deflecting element 65 has the following structure.

As shown in FIG. 6, in the deflecting element 65, a single crystal substrate of silicon (hereinafter referred to merely as a "silicon substrate") 652 functions as the "support member" of the present invention, and two movable plates 656a and 656b (which correspond to "the first and the second movable members" of the present invention) which are obtained by partially processing the silicon substrate 652 are disposed over a predetermined gap in the main scanning direction X. The movable plate 656a is shaped like a flat panel, elastically supported to the silicon substrate 652 by helical springs 657, and capable of freely pivoting about a first axis AX1a which is approximately parallel to the sub scanning direction Y Further, in a central portion of the top surface of the movable plate 656a, an aluminum film or the like is disposed as the first deflection mirror surface 651a. The movable plate 656b has a similar structure to that of the movable plate 656a. In other words, the movable plate 656b shaped like a flat panel is disposed to the silicon substrate 652 such that the movable plate 656b can freely pivot about a first axis AX1b, and an aluminum film or the like is disposed as the second deflection mirror surface 651b in a central portion of the top surface of the movable plate 656a.

In the inner bottom surface of a recess 652a of the silicon substrate 652, electrodes 658a and 658b are fixed at locations opposed against the both ends of the movable plates 656a and 656b. These two electrodes 658a and 658b function as electrodes which are for driving the movable plates 656a and 656b into the pivoting action about the first axes AX1a and AX1b. In other words, the electrodes 658a and 658b are electrically connected with a driver (not shown) of the exposure controller 102, and when a voltage is applied to the electrodes, electrostatic adsorption force acts between these electrodes and the deflection mirror surfaces 651a and 651b and one edge portions of the deflection mirror surfaces 651a and 651b are pulled toward the electrodes. Hence, alternate application of a predetermined voltage from the driver upon the electrodes 658a and 658b vibrates the deflection mirror surfaces 651a and 651b reciprocally about the first axes AX1a and AX1b which are the helical springs 657. When the drive frequencies for obtaining the reciprocal vibrations are set to resonance frequencies belonging to resonance frequency bands B1 and B2 of the deflection mirror surfaces 651a and 651b, the deflection mirror surfaces 651a and 651b vibrate at a large amplitude, thereby increasing the deflection angles of light beams deflected by the deflection mirror surfaces 651a and 651b (See FIG. 8.). FIG. 8 schematically shows the resonance characteristics A and B expressed by the deflection angles of the light beams deflected by the deflection mirror surfaces 651a and 651b, in which the horizontal axis denotes the drive frequencies for driving the deflection mirror surfaces 651a and 651b while the vertical axis denotes the deflection angles of the light beams deflected by the deflection mirror surfaces 651a and 651b. In this embodiment, the electrodes 658a and 658b are symmetrized for each one of the deflection mirror surfaces 651a and 651b so as to make the deflection mirror surfaces 651a and 651b pivot in the opposite phases to each other.

Thus, with respect to the deflecting element (deflector) 65, the driver of the exposure controller 102 functions as the "mirror driver" of the present invention. With the driver controlled, the deflection mirror surfaces 651a and 651b pivot about the first axes AX1a and AX1b in the opposite phases to each other, and the light beam is deflected and scans in the main scanning direction X. That is, the first axes AX1a and AX1b function as main scanning/deflection axes.

The light beam reflected by the first deflection mirror surface 651a of the deflecting element 65 having such a structure described above impinges upon the transmission optical system 67 and then is returned by the transmission optical system 67 back to the second deflection mirror surface 651b of the deflecting element 65. Hence, the light beam deflected by the deflecting element 65 at a first deflection angle for instance is emitted toward the scanning lens 66 at a second deflection angle which is larger than the first deflection angle. In this embodiment, the transmission optical system 67 has the following structure.

As shown in FIG. 4, the transmission optical system 67 is comprised of one convace mirror 671, and a reflection surface 671a of the convace mirror 671 is disposed facing against the first and the second deflection mirror surfaces 651a and 651b. The light beam deflected by the first deflection mirror surface 651a is reflected by the reflection surface 671a of the convace mirror 671 and guided to the second deflection mirror surface 651b. In this embodiment, as the convace mirror 671, an ellipsoidal mirror is used which is obtained by forming the reflection surface 671a as an ellipsoidal surface. To be more specific, used as the reflection surface 671a is a part of an ellipsoidal surface which is formed by rotating an ellipsoid, whose focal points are a position P1a which is approximately at the center of the first deflection mirror surface 651a and a position P1b which is approximately at the center of the second deflection mirror surface 651b, about a virtual line VL which passes through these central positions P1a and P1b. This brings about the following effect. That is, since the first deflection mirror surface 651a and the second deflection mirror surface 651b are located respectively at the two focal points, the principal ray of the light beam deflected by the first deflection mirror surface 651a impinges upon the second deflection mirror surface 651b after reflected by the concave mirror surface (ellipsoidal reflection surface) 671a. This allows securely guiding the light beam deflected by the first deflection mirror surface 651a to the second deflection mirror surface 651b. This light beam is then deflected by the second deflection mirror surface 651b and emitted toward the scanning lens 66. In consequence, the light beam scans stably.

The light beam thus deflected by the deflecting element 65 is irradiated upon the surface (surface-to-be-scanned) of the photosensitive member 2 via the scanning lens 66 and the return mirror 68. As a result, the light beam scans parallel to the main scanning direction X and a line-shaped latent image extending in the main scanning direction X is formed on the surface of the photosensitive member 2.

In this manner, the light beam deflected by the first deflection mirror surface 651a at the first deflection angle for instance is reflected by the concave mirror surface (ellipsoidal reflection surface) 671a toward the second deflection mirror surface 651b, and the second deflection mirror surface 651b deflects the light beam at the second deflection angle which is larger than the first deflection angle toward the scanning lens 66, in this embodiment. The size of the second deflection angle can be expressed schematically as a resonance characteristic C which is the sum of the resonance characteristics A and B (See FIG. 8.). The high-frequency side of the resonance characteristic A partially overlaps the low-frequency side of the resonance characteristic B, and therefore, the resonance characteristic C contains a frequency band in which a deflection angle remains approximately constant. The first and the second resonance frequency bands B1 and B2 partially overlaps each other to form a first drive frequency band DB1. The drive frequency band DB1 partially overlaps a peak-to-peak band PB which is between a first and a second resonance frequencies f1 and f2 of the first and the second deflection mirror surfaces 651*a* and 651*b*, so as to form a second drive frequency band DB2.

In this embodiment, as shown in FIG. 3, at the start or end of the scanning light beam, return mirrors 69*a* through 69*c* guide the scanning light beam emitted from the deflecting element 65 to a synchronization sensor 60. In other words, in this embodiment, the synchronization sensor 60 functions as a horizontal synchronization reading sensor which is for obtaining a synchronizing signal in the main scanning direction X, namely, a horizontal synchronizing signal Hsync.

As described above, in this embodiment, the deflecting element 65 comprises the first and the second deflection mirror surfaces 651*a* and 651*b* which deflect the light beams while pivoting about the first axes AX1*a* and AX1*b* (main scanning/deflection axes) which are parallel to the sub scanning direction Y which is approximately perpendicular to the main scanning direction X. The light beam deflected by the first deflection mirror surface 651*a* toward the transmission optical system 67 is guided by the transmission optical system 67 to the second deflection mirror surface 651*b*, deflected by the second deflection mirror surface 651*b* once again and emitted toward the surface (surface-to-be-scanned) of the photosensitive member 2. In this fashion, the deflection angle of the light beam emitted toward the surface of the photosensitive member is larger than the deflection angle of the light beam which is incident upon the transmission optical system 67.

The first deflection mirror surface 651*a* is structured so as to deflect a light beam wider owing to resonance when driven into the pivoting action at a frequency belonging to the first resonance frequency band B1, whereas the second deflection mirror surface 651*b* is structured so as to deflect a light beam wider owing to resonance when driven into the pivoting action at a frequency belonging to the second resonance frequency band B2 which partially overlaps the first resonance frequency band B1 (See FIG. 8.).

Further, the mirror driver drives the first and the second deflection mirror surfaces 651*a* and 651*b* into the pivoting action within the partial overlap of the first and the second resonance frequency bands B1 and B2. Specifically, the high-frequency side of the first resonance frequency band B1 partially overlaps the low-frequency side of the second resonance frequency band B2 to form the first drive frequency band DB1. The deflection mirror surfaces 651*a* and 651*b* are driven at the frequency fD which belongs to the first drive frequency band DB1, to thereby deflect the light beams. For this reason, as the resonance characteristics A and B of the deflection mirror surfaces 651*a* and 651*b* shift toward the low-frequency side, the deflection angle of the light beam deflected by the first deflection mirror surface 651*a* which is driven at the frequency fD decreases while the deflection angle of the light beam deflected by the second deflection mirror surface 651*b* which is driven at the same frequency fD increases. When the shift is toward the high-frequency side, the opposite behavior is observed. In this manner, the deflection angles of the light beams change in such a manner that the changes of the deflection angles of the light beams deflected by the deflection mirror surfaces 651*a* and 651*b* caused by the changes of the resonance characteristics A and B cancel out each other. Hence, even when the temperature in the surrounding environment changes and the resonance characteristics A and B consequently change, the deflection angle of the light beam deflected by the first deflection mirror surface 651*a* and further deflected by the second deflection mirror surface 651*b* remains stable. It is thus possible to obtain a necessary deflection angle in a stable fashion.

With reference to FIGS. 9A and 9B, a description will now be given on an instance that the sizes of the deflection angles of the light beams deflected by the first and the second deflection mirror surfaces 651*a* and 651*b* stay stable even despite changes of the resonance characteristics A and B. In FIGS. 9A and 9B, the horizontal axis denotes the drive frequencies for driving the deflection mirror surfaces 651*a* and 651*b*, while the vertical axis denotes the size of the deflection angle of the light beam deflected by the first deflection mirror surface 651*a*, guided by the transmission optical system 67 to the second deflection mirror surface 651*b* and then deflected by the second deflection mirror surface 651*b*. In this embodiment, the deflection mirror surfaces 651*a* and 651*b* are driven into the pivoting action at the frequency fD described above and deflect the light beams at a deflection angle whose size is on the chain line which refers to the resonance characteristic C denoted by the broken line. When the resonance characteristics A and B shift toward the high-frequency side in accordance with a change of the temperature in the surrounding environment, the deflection angle of the light beam deflected by the second deflection mirror surface 651*b* toward the scanning lens 66 also shifts toward the high-frequency side, which is a resonance characteristic C1 (See FIG. 9A). However, as described above, since the deflection angle of the light beam deflected by the first deflection mirror surface 651*a* increases and the deflection angle of the light beam deflected by the second deflection mirror surface 651*b* decreases, the deflection angle of the finally deflected light beam toward the scanning lens 66 does not change as shown in FIG. 9A. Even when the resonance characteristics A and B shift toward the low-frequency side, for a similar reason, the deflection angle of the finally deflected light beam toward the scanning lens 66 does not change as shown in FIG. 9B. In this manner, despite changes of the resonance characteristics A and B owing to a change of the temperature in the surrounding environment, it is possible to stabilize the deflection angle of the light beam deflected by the first deflection mirror surface 651*a* and then further deflected by the second deflection mirror surface 651*b*.

Further, in the structure according to this embodiment, the first resonance frequency f1 belonging to the first resonance frequency band B1, at which the deflection angle of the light beam deflected by the first deflection mirror surface 651*a* is the largest, is different from the second resonance frequency f2 belonging to the second resonance frequency band B2 at which the deflection angle of the light beam deflected by the second deflection mirror surface 651*b* is the largest. In addition, both the first and the second resonance frequencies f1 and f2 are contained in the first drive frequency band DB1. Hence, it is possible to widen the first drive frequency band DB1 which stabilizes the deflection angle of a light beam.

Still further, in this embodiment, the mirror driver drives the first and the second deflection mirror surfaces 651*a* and 651*b* into the pivoting action at a frequency belonging to the second drive frequency band DB2 in which the peak-to-peak band PB, which is between the first and the second resonance frequencies f1 and f2, partially overlaps the first drive frequency band DB1. Since the first and the second deflection mirror surfaces 651a and 651b are driven into the pivoting action at a frequency which is close to the first and the second resonance frequencies f1 and f2, it is possible to deflect a light beam at an even greater deflection angle and stabilize the deflection angle of the light beam. Moreover, the first and the second deflection mirror surfaces 651a and 651b are driven into the pivoting action at the frequency fD which is approximately at the center of the second drive frequency band DB2. Hence, even when the resonance characteristics A and B shift even greatly toward the high-frequency side or the low-frequency side, it is possible to deflect a light beam at a stable deflection angle (See FIGS. 9A and 9B.).

In addition, in the structure according to this embodiment, the deflection angle of the light beam deflected by the first deflection mirror surface 651a which is driven into the pivoting action in the first resonance frequency band B1 monotonously increases in accordance with a frequency increase within the lower frequency range to the first resonance frequency f1 but monotonously decreases in accordance with a frequency increase within the higher frequency range to the first resonance frequency f1. Whereas the deflection angle of the light beam deflected by the second deflection mirror surface 651b which is driven into the pivoting action in the second resonance frequency band B2 monotonously increases in accordance with a frequency increase within the lower frequency range to the second resonance frequency f2 but monotonously decreases in accordance with a frequency increase within the higher frequency range to the second resonance frequency f2. Hence, the changes of the deflection angles of the light beams deflected by the deflection mirror surfaces 651a and 651b caused by changes of the resonance characteristics A and B cancel out each other more securely, whereby the deflection angles of the light beams is further stabilized.

Further, in the structure according to this embodiment, used as the transmission optical system is the concave surface mirror 671 whose reflection surface 671a is disposed facing against the first and the second deflection mirror surfaces 651a and 651b, and as the reflection surface 671a reflects toward the second deflection mirror surface 651b the light beam deflected by the first deflection mirror surface 651a, the light beam is emitted from the second deflection mirror surface 651b toward the surface (surface-to-be-scanned) of the photosensitive member 2. Moreover, the first deflection mirror surface 651a and the second deflection mirror surface 651b, when driven, pivot in the opposite phases to each other and deflect the light beams. Using the convace mirror 671 as the transmission optical system 67 in this manner, the transmission optical system 67 is formed by only one convace mirror 671. Thus, the transmission optical system is fabricated in a simpler structure using less optical parts and components than in a conventional apparatus where a plurality of optical parts and components (two transmission lenses) are definitely required to form a transmission optical system. Another advantage is that since transmission lenses are not necessary, it is possible to eliminate the influence of chromatic aberration and deflect a light beam at excellent stability.

Further, this embodiment demands that the first and the second deflection mirror surfaces 651a and 651b are arranged side by side in the parallel direction to the main scanning direction X. Because of this, it is not necessary that angled light beams with respect to the main scanning plane are incident upon and leave the first and the second deflection mirror surfaces 651a and 651b. In other words, this permits disposing the optical parts and components of the optical scanning apparatus within the same main scanning plane. As a result, the apparatus is reduced in terms of size in the sub scanning direction Y, i.e., reduced in terms of thickness.

Further, in the structure according to this embodiment, the first and the second deflection mirror surfaces 651a and 651b are both approximately conjugated relative to the surface (surface-to-be-scanned) of the photosensitive member 2 in the sub scanning plane which is approximately perpendicular to the main scanning direction X. This structure prevents the influence of pivoting of the two deflection mirror surfaces 651a and 651b in the sub scanning direction Y This also reduces the sizes of the deflection mirror surfaces 651a and 651b in the sub scanning direction Y, and hence, the size and the weight of the deflecting element (deflector). In consequence, it is possible to further improve the speed at which the deflection mirror surfaces 651a and 651b are driven and further increase the scanning speed of the light beam.

Further, in this embodiment, since the deflection mirror surfaces 651a and 651b and the support member are formed integral with each other by micro-machining one silicon substrate 652, the deflecting element (deflector) 65 is formed highly accurately, which is advantageous in improving the scannability of the light beam. In addition, the movable plates 656a and 656b are supported for free pivoting, owing to about the same spring characteristic as that of stainless steel. Therefore, it is possible to make the first and the second deflection mirror surfaces 651a and 651b pivot in a stable fashion at a high speed.

Second Embodiment

Figure 10:
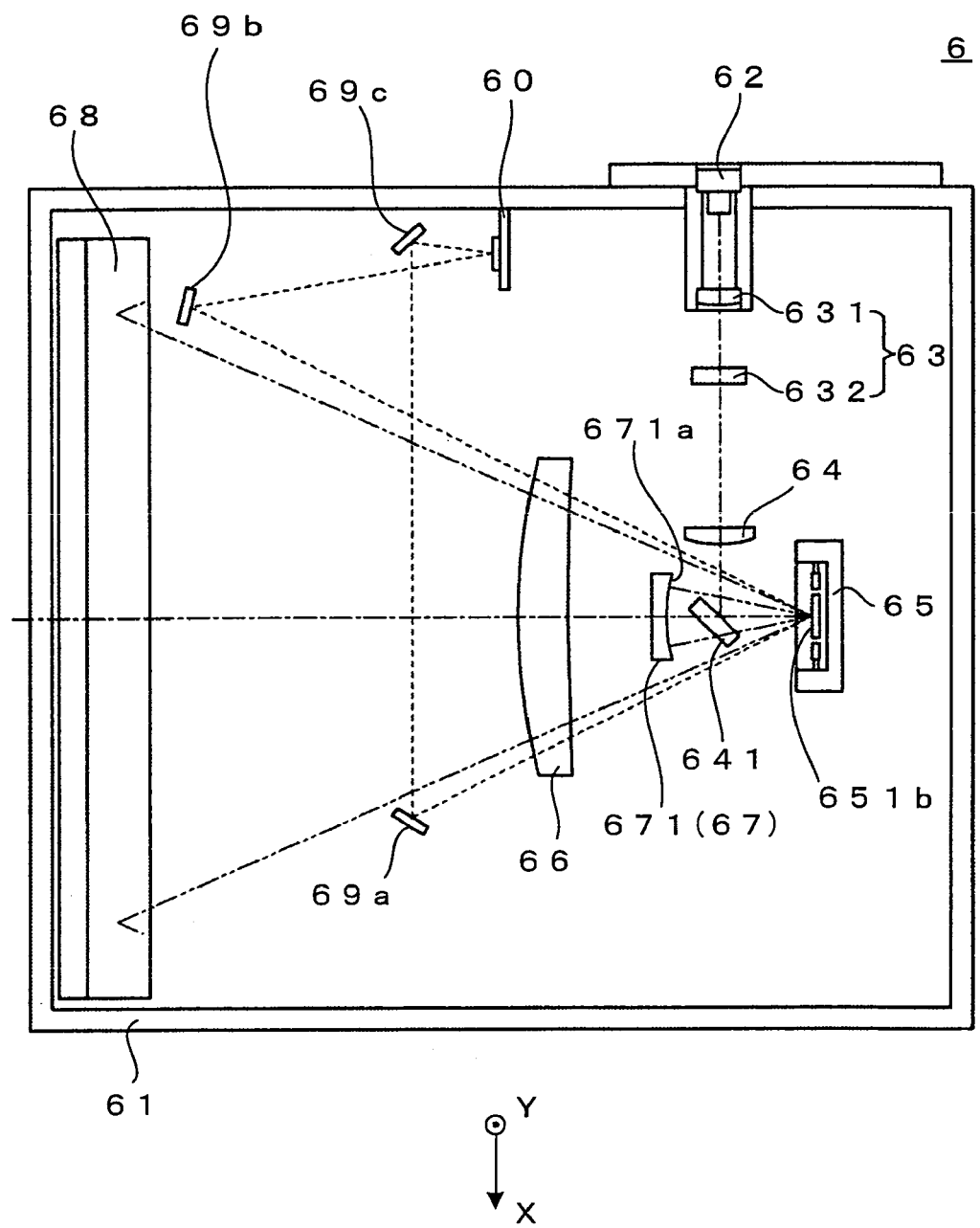
FIGS. 10 and 11 are main-scanning cross sectional views of an exposure unit which is a second embodiment of the optical scanning apparatus according to the present invention.
Figure 11:
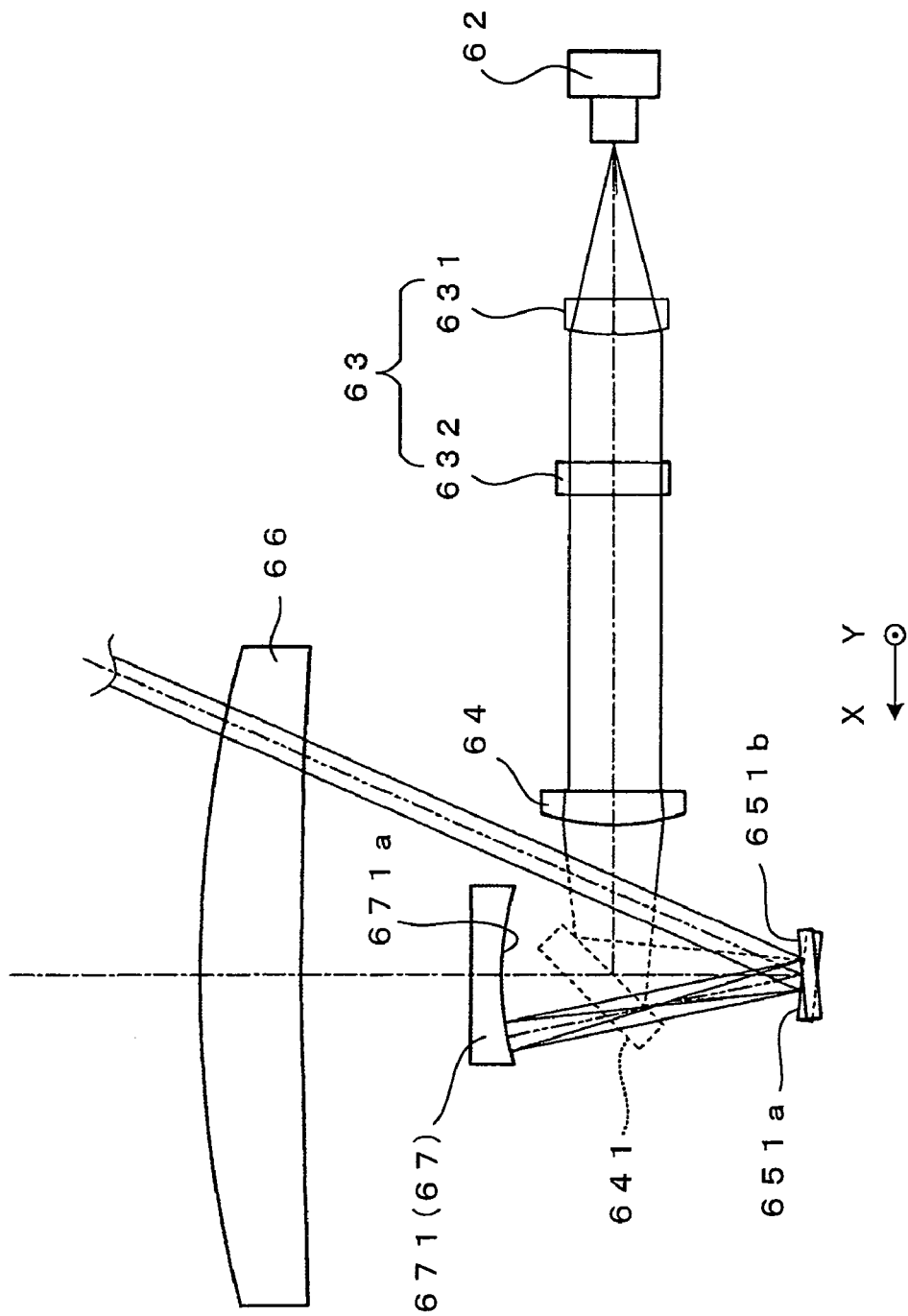
Figure 12:
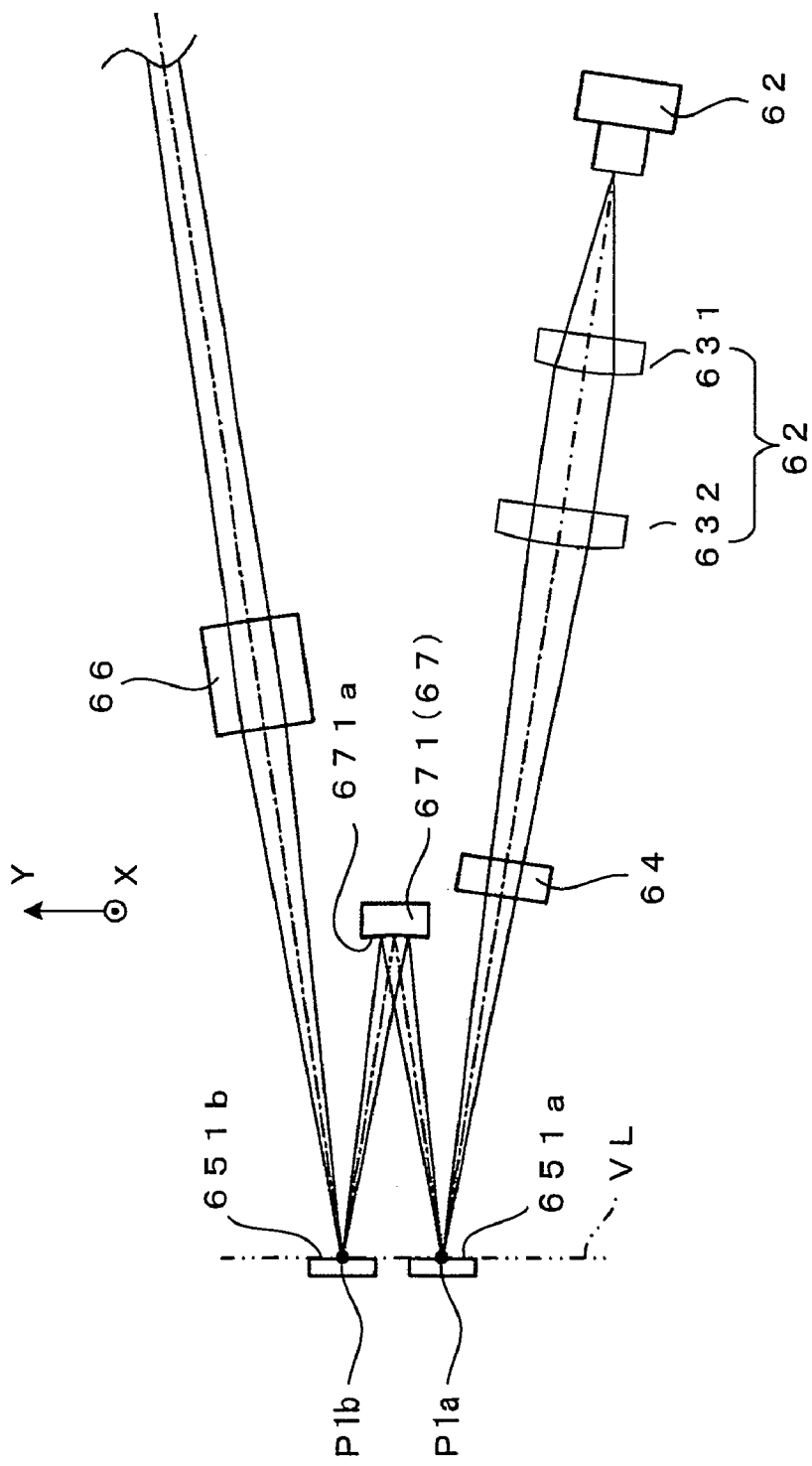
FIG. 12 is a sub-scanning cross sectional view of the optical scanning apparatus which is shown in FIGS. 10 and 11.

FIGS. 10 and 11 are main-scanning cross sectional views which shows a second embodiment of the optical scanning apparatus according to the present invention. FIG. 12 is a sub-scanning cross sectional view of the optical scanning apparatus which is shown in FIG. 10. A major difference of the exposure unit 6 of the second embodiment from the first embodiment lies in the structure of the deflecting element 65. That is, in the second embodiment, as shown in FIG. 12, the first and the second deflection mirror surfaces 651a and 651b are arranged side by side in the sub scanning direction Y In the exposure unit 6 having such a structure, the light beam from the single laser source 62 impinges upon the cylindrical lens 632 which has power only along the sub scanning direction Y as shown in FIG. 12, after shaped into collimated light of a proper size by the collimator lens 631. Meanwhile, the light beam transmitted by the cylindrical lens 632 is returned by the return mirror 641 toward the first deflection mirror surface 651a after impinging upon the converging lens 64 which has power only along the main scanning direction X as shown in FIG. 11. As the cylindrical lens 632 is adjusted, the collimated light is imaged in the vicinity of the deflection mirror surface 651a which is at a lower position along the sub scanning direction Y The light beam deflected by the deflection mirror surface 651a is reflected by the reflection surface 671a of the transmission optical system 67, guided to the deflection mirror surface 651b which is located at an upper position, and deflected by the deflection mirror surface 651b toward the scanning lens 66.

In the second embodiment as well, the first and the second deflection mirror surfaces 651a and 651b deflect the light beams when driven by the mirror driver into the pivoting action at a drive frequency which is the frequency fD belonging to the second drive frequency band DB2, thereby achieving a similar effect to that realized by the first embodiment. Further, since the convace mirror 671 of the transmission optical system 67 returns the light beam, a similar effect to that realized by the first embodiment is obtained. In addition, since the first and the second deflection mirror surfaces 651a and 651b are arranged side by side in the sub scanning direction Y, the area size occupied by the deflecting element (deflector) 65 is minimum within the main scanning plane as shown in FIGS. 10 and 11, whereby the size of the apparatus within the main scanning plane is reduced and the apparatus is fabricated compact.

Third Embodiment

Figure 13:
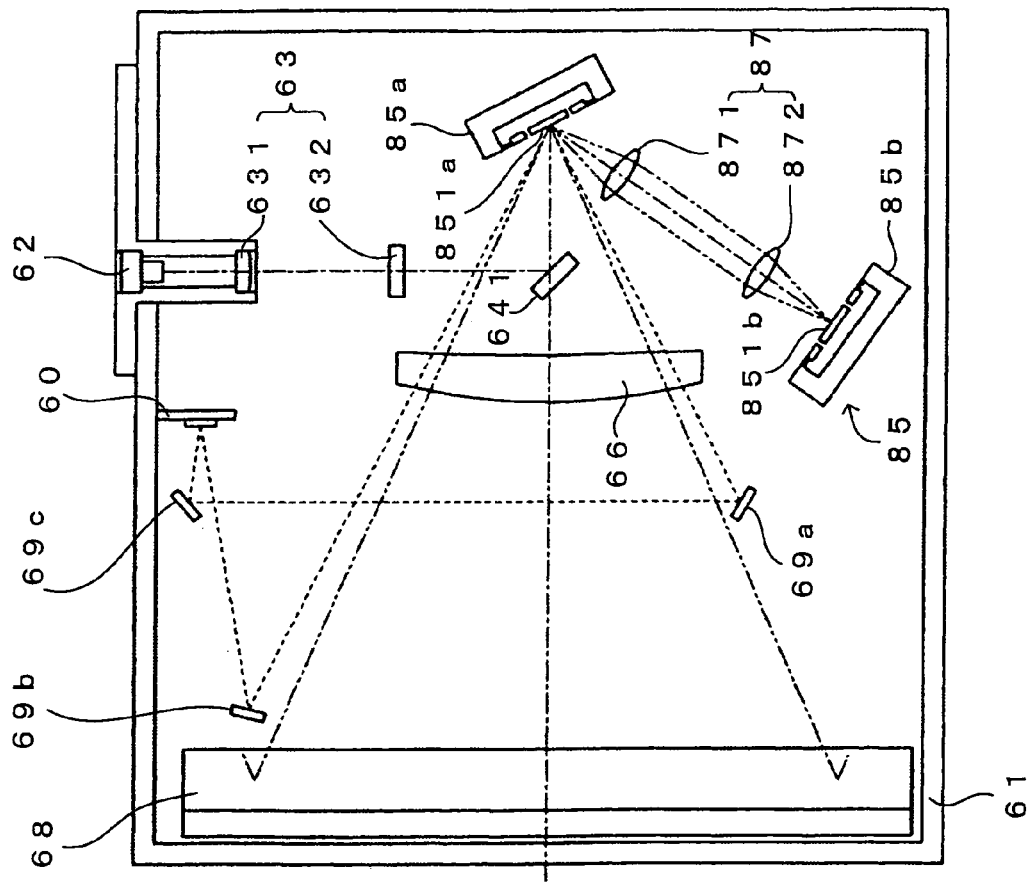
FIG. 13 is a main-scanning cross sectional view of an exposure unit which is a third embodiment of the optical scanning apparatus according to the present invention.
Figure 14:
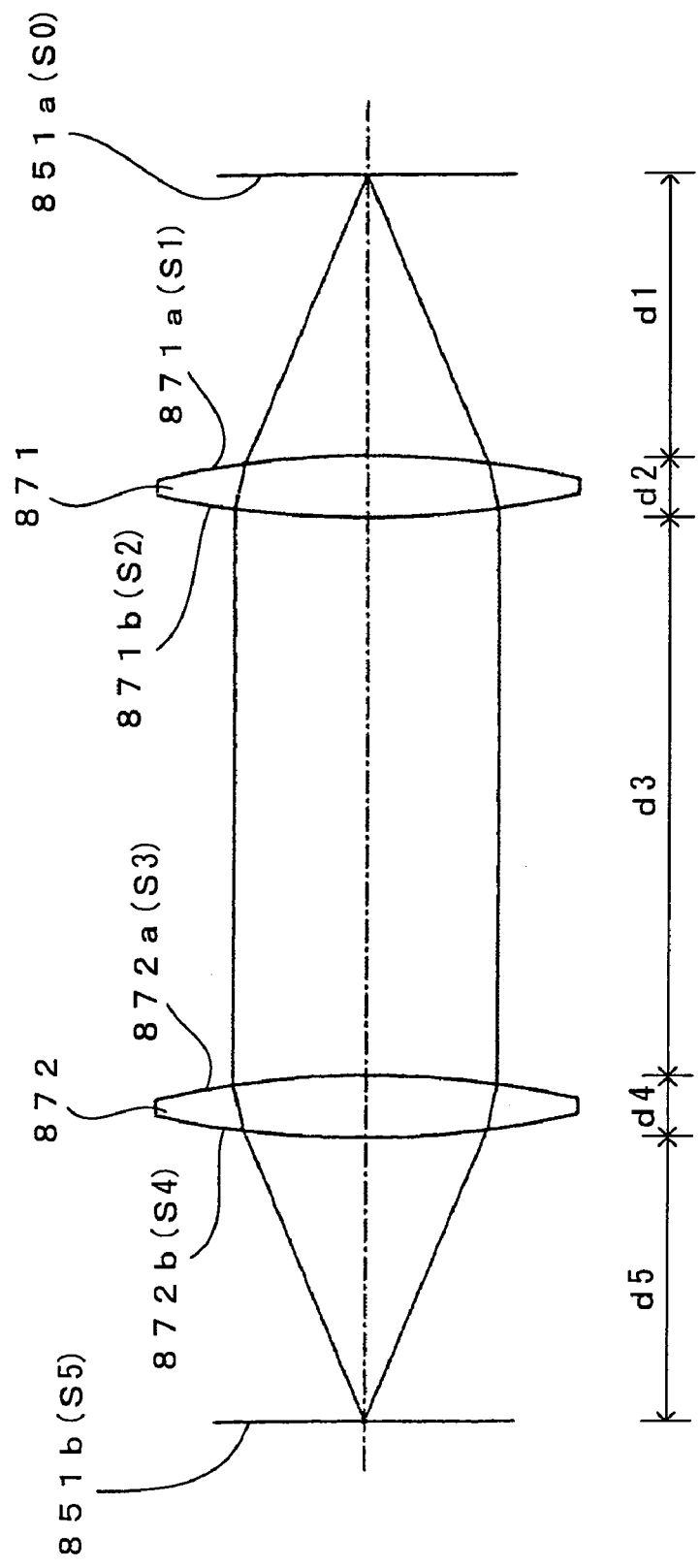
FIG. 14 shows a transmission optical system which is one of components which form the exposure unit (optical scanning apparatus) which is shown in FIG. 13.
Figure 15:
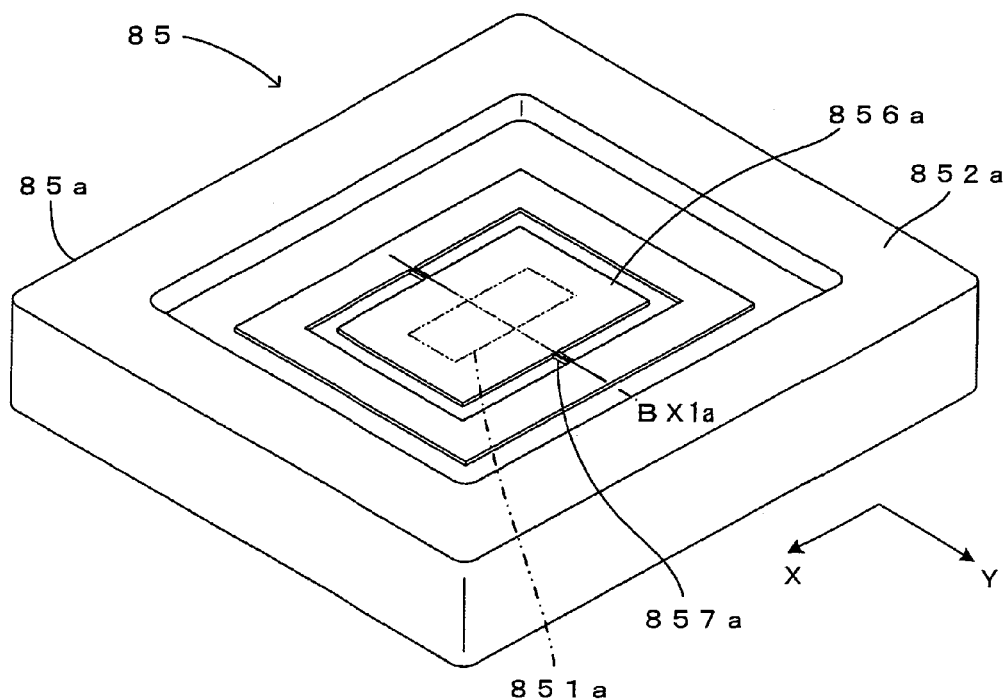
FIGS. 15 and 16 are drawings of a deflecting element which is one of the components forming the exposure unit.
Figure 16:
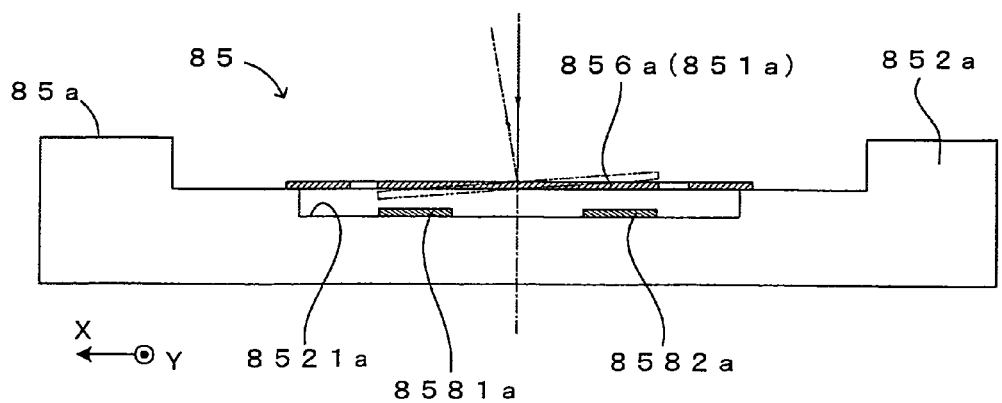

FIG. 13 is a drawing which shows a third embodiment of the optical scanning apparatus according to the present invention. FIG. 13 is a main-scanning cross sectional view showing the structure of an exposure unit (optical scanning apparatus) which is disposed inside the image forming apparatus which is shown in FIG. 1. FIG. 14 shows a transmission optical system which is one of components which form the exposure unit. FIGS. 15 and 16 are drawings of a deflecting element which is one of the components of the exposure unit. A major difference of this embodiment from the first and the second embodiments above lies in the structure of a transmission optical system 87, which transmits a light beam between a first deflection mirror surface 851a and a second deflection mirror surface 851b, and the structure of deflector 85, as shown in FIG. 13. The structure and operations of the exposure unit will now be described in detail referring to these drawings, with a main focus on the differences from the first and the second embodiments.

The deflector 85 is comprised of two deflecting elements 85a and 85b. Since the deflecting elements 85a and 85b have the identical structures, the structure of the deflecting element 85a alone will be described, and the structure of the other deflecting element 85b will not be described but will be denoted at corresponding reference symbols. The deflecting element 85a is made using a micro machining technique which is an application of semiconductor manufacturing techniques and which aims at forming an integrated micro machine on a semiconductor substrate, and the deflecting element 85 is capable of deflecting a light beam reflected by the deflection mirror surface 851a in the main scanning direction X. To be more specific, the deflecting element 85 has the following structure.

As shown in FIG. 15, in the deflecting element 85a, a silicon substrate 852a functions as the "support member" of the present invention, and a movable plate 856a (i.e., the "movable member" of the present invention) which is obtained by partially processing the silicon substrate 852a is disposed. The movable plate 856a is shaped like a flat panel, elastically supported to the silicon substrate 852a by a helical spring 857a, and capable of freely pivoting about a first axis BX1a which is approximately parallel to the sub scanning direction Y Further, in a central portion of the top surface of the movable plate 856a, an aluminum film or the like is disposed as the deflection mirror surface 851a.

There is a recess 8521a approximately at the center of the silicon substrate 852a as shown in FIG. 16, which makes it possible for the movable plate 856a to pivot about the first axis BX1a. At locations opposed against the both edge portions of the movable plate 856a, electrodes 8581a and 8581b are fixed to the inner bottom surface of the recess 8521a. The two electrodes 8581a and 8581b function as electrodes which drive the movable plate 856a into the pivoting action about the first axis BX1a. In short, these electrodes 8581a and 8581b are electrically connected with a driver (not shown) of the exposure controller 102, and when a voltage is applied to one electrode, electrostatic adsorption force acts between this electrode and the deflection mirror surface 851a and one edge portion of the deflection mirror surface 851a is pulled toward this electrode. Hence, alternate application of a predetermined voltage from the driver upon the electrodes 8581a and 8581b vibrates the deflection mirror surface 851a reciprocally about the first axis BX1a which is the helical spring 857a. When the drive frequency for causing the reciprocal vibrations is set to a frequency belonging to a resonance frequency band of the deflection mirror surface 851a, the deflection mirror surface 851a vibrates at large amplitude and deflects the light beam at an increased deflection angle. In this embodiment, the first deflection mirror surface 851a and the second deflection mirror surface 851b pivot in the same phase.

Thus, with respect to the deflector 85, the driver of the exposure controller 102 functions as the "mirror driver" of the present invention. With the driver controlled, the deflection mirror surfaces 851a and 851b pivot about the first axes as in the first and the second embodiments described above, and the light beam is deflected and scans in the main scanning direction X. That is, the first axes function as the main scanning/deflection axes.

The light beam deflected by the first deflection mirror surface 851a of the deflecting element 85a having such a structure described above impinges upon the transmission optical system 87 and the transmission optical system 87 then makes the second deflection mirror surface 851b of the deflecting element 85b deflect the light beam once again, so that the light beam impinges upon the transmission optical system 87 again. The light beam is thereafter returned back to the first deflection mirror surface 851a of the deflecting element 85a. Hence, the light beam deflected by the deflecting element 85a at a first deflection angle for instance is deflected by the deflecting element 85b toward the transmission optical system 87 at a second deflection angle which is larger than the first deflection angle and returned back to the deflecting element 85a. The light beam is thereafter deflected toward the scanning lens 66 at a third deflection angle which is larger than the second deflection angle. In this embodiment, the transmission optical system 87 has the following structure.

FIG. 14 is a drawing which shows the structure of the transmission optical system. The transmission optical system 87 comprises a first transmission lens 871, which is disposed such that its front focal point approximately coincides with an approximately central position of the first deflection mirror surface 851a, and a second transmission lens 872 which is disposed such that its front focal point approximately coincides with the rear focal point of the first transmission lens 871 and its rear focal point approximately coincides with an approximately central position of the second deflection mirror surface 851b. The light beam deflected by the first deflection mirror surface 851a at the first deflection angle toward the first transmission lens 871 is guided via the first and the second transmission lenses 871 and 872 to the second deflection mirror surface 851b, and as the second deflection mirror surface 851b deflects this light beam at the second deflection angle toward the second transmission lens 872, the light beam is guided to the first deflection mirror surface 851a. In this manner, the first deflection mirror surface 851a deflects the light beam once again and emits toward the scanning lens 66 at the third deflection angle which is larger than the first deflection angle.

The specific structure of the transmission optical system 87 having such a characteristic may be one which provides optical data shown in Table 1.

TABLE 1

| SURFACE $S_i$ | RADIUS OF CURVATURE $r_i$ | SURFACE SEPARATION $d_i$ | INDEX OF REFRACTION $n_i$ |
|---|---|---|---|
| $S_0$ | | 15 | (DEFLECTION SURFACE) |
| $S_1$ | $r_1 = 21.62846$<br>$K_1 = 4.43549$<br>$A_1 = 0.114557 \times 10^3$<br>$B_1 = 0.533035 \times 10^6$ | 5 | 1.51452 |
| $S_2$ | $r_2 = -13.42498$<br>$K_2 = -0.961611$<br>$A_2 = 0.163854 \times 10^3$<br>$B_2 = 0.332179 \times 10^5$ | 30 | |
| $S_3$ | $r_2 = 13.42498$<br>$K_2 = -0.961611$<br>$A_2 = -0.163854 \times 10^3$<br>$B_2 = -0.332179 \times 10^5$ | 5 | 1.51452 |
| $S_4$ | $r_1 = -21.62846$<br>$K_1 = 4.43549$<br>$A_1 = -0.114557 \times 10^3$<br>$B_1 = -0.533035 \times 10^6$ | 15 | |
| $S_5$ | | | (REFLECTION SURFACE) |

In this design example, the two surfaces S1 and S2 of the first transmission lens 871 which forms the transmission optical system 87 and the two surfaces S3 and S4 of the second transmission lens 872 which forms the transmission optical system 87 are axisymmetric aspheric surfaces. The symbols used in the table denote the following:

Si: lens surface number (S0 denotes the first deflection mirror surface 851a, and S5 denotes the second deflection mirror surface 851b.)

ri: the radius of curvature of the lens surface i di: the axial distance from the lens surface i to the lens surface (i+1)

ni: the index of refraction of the lens surface i

Ki: the aspherical coefficient of the axisymmetric aspheric surface expressed by the following formula when the lens surface i is an axisymmetric aspheric surface $$z_i = \frac{y^2/r_i}{1+\sqrt{1-(K_i+1)(y/r_i)^2}} + A_i y^4 + B_i y^6 \quad \text{FORMULA 1}$$

where the symbol z denotes a distance from the tangential plane to the aspheric surface apex among aspheric points which is at the height y from the optical axis.

In this embodiment, since the position of reflection at which the first deflection mirror surface 851a reflects the light beam and the position of reflection at which the second deflection mirror surface 851b reflects the light beam are conjugated relative to each other, it is possible to securely guide the light beam from the first deflection mirror surface 851a to the second deflection mirror surface 851b and from the second deflection mirror surface 851b to the surface (surface-to-be-scanned) of the photosensitive member 2 and stably deflect the light beam.

The light beam impinging upon the deflecting element 85a twice and accordingly deflected is irradiated upon the surface (surface-to-be-scanned) of the photosensitive member 2 via the scanning lens 66 and the return mirror 68. As a result, the light beam scans parallel to the main scanning direction X and a line-shaped latent image extending in the main scanning direction X is formed on the surface of the photosensitive member 2.

In this embodiment too, the first and the second deflection mirror surfaces 851a and 851b are driven into the pivoting action in a similar manner to those in the first and the second embodiments described above, thereby achieving similar effects to those according to the first and the second embodiments.

Further, since the first deflection mirror surface 851a is approximately conjugated relative to the surface (surface-to-be-scanned) of the photosensitive member 2 within the sub scanning plane which is approximately perpendicular to the main scanning direction X (not shown), it is possible to prevent the influence of pivoting of the first deflection mirror surface 851a, which is conjugated relative to the surface-to-be-scanned, in the sub scanning direction Y This also reduces the size of the first deflection mirror surface 851a in the sub scanning direction Y, and hence, the size and the weight of the deflecting element 85a.

Fourth Embodiment

Figure 17:
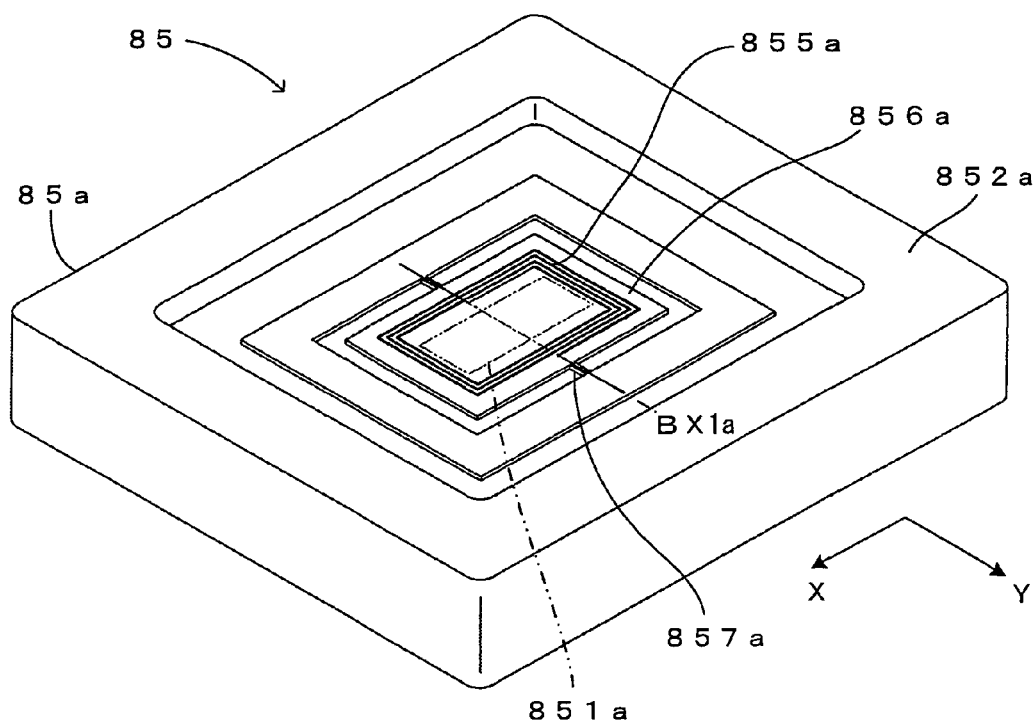
FIGS. 17 and 18 are drawings of a deflecting element of an exposure unit which is a fourth embodiment of the optical scanning apparatus according to the present invention.
Figure 18:
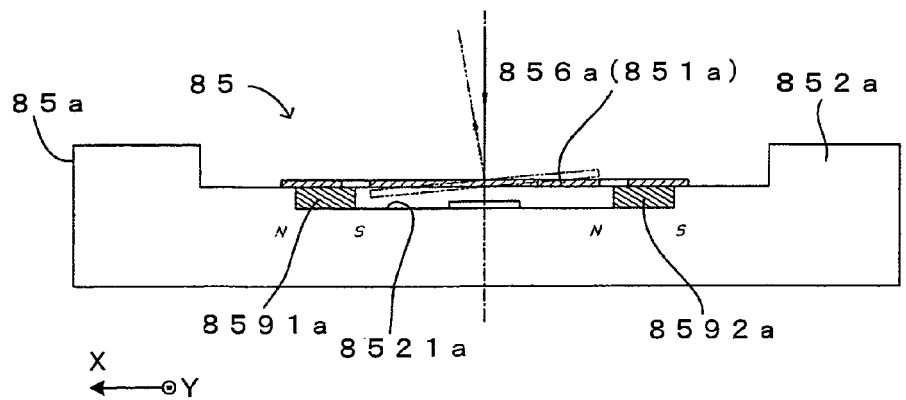

FIGS. 17 and 18 are drawings which show a fourth embodiment of the optical scanning apparatus according to the present invention. A major difference of the fourth embodiment from the third embodiment is that electromagnetic force is used to drive the deflection mirror surfaces 851a and 851b into the pivoting action, and the other structures are similar to those according to the third embodiment. A structure similar to the structure of the fourth embodiment may be applied also to the deflecting element 65 of the first and the second embodiments, to thereby drive the deflection mirror surfaces 651a and 651b into the pivoting action using electromagnetic force. In the following, the deflecting element 85a shown in FIGS. 17 and 18 will be described as an example. The same structures as those according to the third embodiment will be denoted at the same reference symbols.

The deflecting element 85a, as shown in FIG. 17, comprises the movable plate 856a which is obtained by partially processing the silicon substrate 852a. The movable plate 856a is shaped like a flat panel, elastically supported to the silicon substrate 852a by a torsion spring 857a, and capable of freely pivoting about the first axis BX1a which is approximately parallel to the sub scanning direction Y In the top surface of the movable plate 856a, an insulation layer covers a flat coil 855a which is electrically connected via the torsion spring 857a with a pair of outside electrode terminals (not shown) formed in the top surface of the silicon substrate 852a. Further, in a central portion in the top surface of the movable plate 856a, an aluminum film or the like is disposed as the deflection mirror surface 851a.

There is the recess 8521a in an approximately central portion of the silicon substrate 852a in such a manner that the movable plate 856a can pivot about the first axis BX1a, as shown in FIG. 18. In the inner bottom surface of the recess 8521a, permanent magnets 8591a and 8592a are fixed to in mutually different directions at outer positions to the both edge portions of the movable plate 856a. The flat coil 855a is electrically connected with a driver (not shown) of the exposure controller 102, due to which as the coil 855a is energized, Lorentz's force acts because of the direction of the current flowing in the flat coil 855a and the direction of magnetic flux created by the permanent magnets 8591a and 8592a and moment accordingly develops which rotates the movable plate 856a. In this manner, the movable plate 856a (the deflection mirror surface 851a) pivots about the torsion spring 857a which in this circumstance serves as the first axis BX1a. When an alternating current is supplied as the current flowing in the flat coil 855a for continuous repetitions, the deflection mirror surface 851a vibrates reciprocally about the torsion spring 857a which is the first axis BX1a. When the drive frequency for creating the reciprocal vibrations is set to a frequency belonging to the resonance frequency band for the deflection mirror surface 851a, the deflection mirror surface 851a vibrates at large amplitude and deflects the light beam at an increased deflection angle.

Electromagnetic force, electrostatic force or the like is used to make the first deflection mirror surface 851a pivot as described above, and any desired one of these may be used. However, since each drive method has its own features, it is preferable that one of these is chosen considering the features of the respective drive methods. That is, when electromagnetic force is used as the drive force for making the first deflection mirror surface 851a pivot, it is possible to drive the first deflection mirror surface 851a into the pivoting action at a lower drive voltage than that used where electrostatic adsorption force is developed, voltage controls is therefore easy and the accuracy of positioning a scanning light beam enhances. In contrast, when electrostatic adsorption force is used as the drive force, it is not necessary to form the coil pattern, the deflecting element 85a is fabricated even smaller, and deflection/scanning becomes faster.

Fifth Embodiment

A fifth embodiment of the optical scanning apparatus according to the present invention will now be described. A structure used as the fifth embodiment is basically the same as the structure of the optical scanning apparatus described earlier as the third embodiment, and operations alone are partially different. Therefore, only operations unique to the fifth embodiment will be described, while skipping the common structures and operations of the apparatus.

Figure 19:
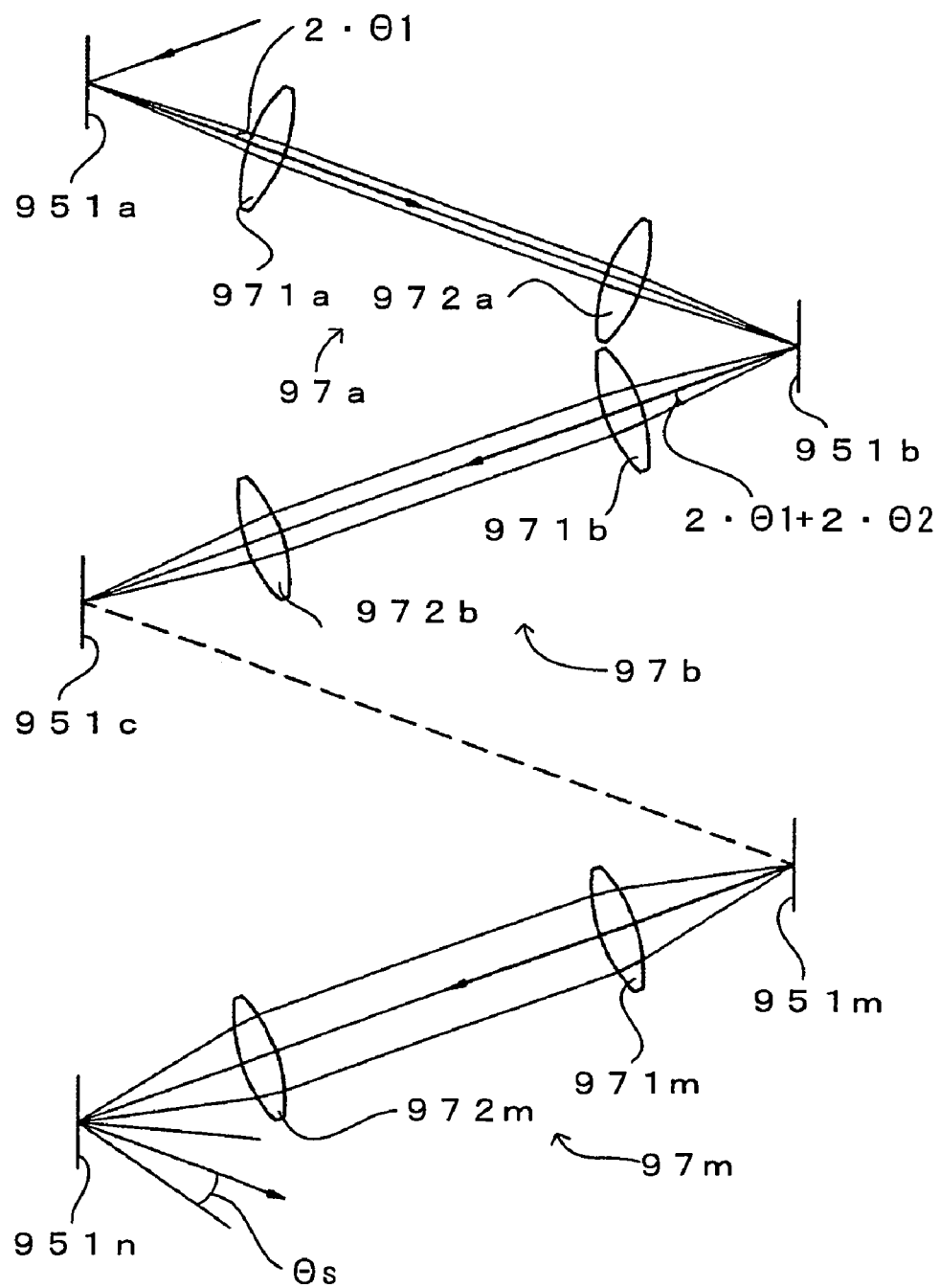
FIG. 19 is a schematic drawing of an optical scanning apparatus in which a plurality of deflection mirror surfaces deflect a light beam.

A major difference of the fifth embodiment from the third embodiment above is that the drive frequencies and phases of the deflection mirror surfaces 851a and 851b are set to drive frequencies and phases described in detail below to drive the deflection mirror surfaces 851a and 851b into the pivoting action. The relationships between the drive frequencies and the phases of the respective deflection mirror surfaces will now be described in detail with reference to FIGS. 19 to 21C. FIG. 19 is a schematic drawing of an optical scanning apparatus in which a plurality of deflection mirror surfaces deflect a light beam. FIGS. 20A through 20C are schematic drawings showing conditions which the optical scanning apparatus of FIG. 19 needs satisfy in order to increase the deflection angle of a light beam. FIGS. 21A through 21C are schematic drawings which show the basis of a phase time difference which satisfy the conditions which are shown in FIGS. 20A through 20C.

FIG. 19 is a schematic drawing of an optical scanning apparatus which makes a light beam scan using N deflection mirror surfaces (where N is a natural number satisfying N≧2). In this apparatus, a light beam leaves an N-th deflection mirror surface 951n at a deflection angle Θs after deflected by the first through the N-th deflection mirror surfaces 951a, 951b, 951c, . . . , 951m and 951n. Transmission lenses 971a, 972a, 971b, 972b, . . . , 971m and 972m having the same power are disposed two each between these deflection mirror surfaces, thereby forming transmission optical systems 97a, 97b, . . . , 97m which transmit the light beam from one deflection mirror surface to another. When the angle of rotation of the i-th deflection mirror surface is Θi for instance, the i-th deflection mirror surface deflects the light beam at a deflection angle 2·Θi. The broken line in FIG. 19 denotes that FIG. 19 omits the deflection mirror surfaces disposed between the third deflection mirror surface and the m-th deflection mirror surface and the corresponding transmission optical systems.

Since the transmission optical systems 97a through 97m have the identical structures, the transmission optical system 97a alone will be described. The other transmission optical systems will not be described but will be denoted at corresponding reference symbols. The transmission optical system 97a comprises a transmission lens 971a, which is disposed such that its front focal point approximately coincides with an approximately central position of the first deflection mirror surface 951a, and a transmission lens 972a which is disposed such that its front focal point approximately coincides with the rear focal point of the transmission lens 971a and its rear focal point approximately coincides with an approximately central position of the second deflection mirror surface 951b. The light beam deflected by the first deflection mirror surface 951a at the first deflection angle 2·Θ1 toward the transmission lens 971a is guided via the transmission lenses 971a and 972a toward the second deflection mirror surface 951b, and the second deflection mirror surface 951b deflects this light beam toward the transmission lens 971b at a deflection angle (2·Θ1+2·Θ2) which is an increase by a second deflection angle 2·Θ2.

The light beam deflected toward the transmission lens 971b is guided to the third deflection mirror surface 951c via the transmission lenses 971b and 972b. The third deflection mirror surface 951c deflects the light beam guided to the same toward the next transmission lenses (not shown) at a deflection angle (2·Θ1+2·Θ2+2·Θ3) which is an increase by a third deflection angle 2·Θ3. Similar operations continue until the light beam has been guided to the N-th deflection mirror surface 951n.

The light beam thus guided to the N-th deflection mirror surface is emitted from the N-th deflection mirror surface 951n at the deflection angle Θs which is a further increase by an N-th deflection angle 2·ΘN. The deflection angle Θs is therefore the sum of the deflection angles at which the respective deflection mirror surfaces deflect the light beams.

The respective deflection mirror surfaces deflect the light beams while pivoting at predetermined pivot frequencies. However, in this situation, the respective deflection mirror surfaces may cancel out the deflection angles of the light beam depending upon how the pivot frequencies and phases of the respective deflection mirror surfaces are set, which may result in a failure to obtain a sufficient deflection angle. Noting this, this embodiment uses the structure shown in FIGS. 20A through 20C which attains a necessary deflection angle without fail. This structure will now be described in detail.

In the structure shown in FIGS. 20A through 20C, when the third deflection mirror surface 951c is used as a reference deflection mirror surface, the deflection angle Θs of the light beam leaving the N-th deflection mirror surface 951n is always larger than the maximum deflection angle 2·Θ3max of the light beam deflected by the third deflection mirror surface 951c in a predetermined direction. Shown in FIG. 20A is the angle of rotation of the reference deflection mirror surface (the third deflection mirror surface 951c) at the time t, shown in FIG. 20B is the angle of rotation of the first deflection mirror surface 951a at the time t, and shown in FIG. 20C is the angle of rotation of the i-th deflection mirror surface 951 (where i is a natural number satisfying 1≦i≦N except for i=1, 3) at the time t.

As shown in FIG. 20A, the reference deflection mirror surface (the third deflection mirror surface 951c) reaches the maximum angle of rotation Θ3max in the forward direction at the time t3max and deflects the light beam at the maximum deflection angle 2·Θ3max. At this stage, in order to secure that the deflection angle of the light beam emitted from the N-th deflection mirror surface 951n exceeds 2·Θ3max, the directions of deflection in which the other deflection mirror surfaces deflect the light beams may all be the same as the direction in which the reference deflection mirror surface (the third deflection mirror surface 951c) deflects the light beam. In other words, the pivot frequencies and the phases of the other deflection mirror surfaces than the reference deflection mirror surface may be set such that the angles of rotation Θ1a and Θia of the first and the i-th deflection mirror surfaces shown in FIGS. 20B and 20C at the time t3max are the same direction, namely, the forward direction. By means of this structure, the deflection angle Θs of the light beam leaving the N-th deflection mirror surface 951n becomes always larger than the maximum deflection angle 2·Θ3max of the light beam deflected by the reference deflection mirror surface (the third deflection mirror surface 951c) in the predetermined direction.

Next, in a structure that each deflection mirror surface deflects a light beam while pivoting at a predetermined pivot frequency in a sinusoidal waveform expressed by FORMULA 2, an A-th deflection mirror surface (where A is a natural number satisfying $1 \leq A \leq N$) is used as the reference deflection mirror surface. In this case, with the deflection mirror surfaces pivoting as described in detail below, the deflection angle Θs of the light beam leaving the N-th deflection mirror surface 951n always becomes larger than the maximum deflection angle 2·Θ3max of the light beam deflected by the A-th deflection mirror surface in the predetermined direction. FIG. 21A shows the angle of rotation of the A-th deflection mirror surface at the time t while the A-th deflection mirror surface pivots at a reference pivot frequency f. FIG. 21B shows a state that the phase has delayed αimim, while FIG. 21C shows the angle of rotation of the i-th deflection mirror surface (where i is a natural number satisfying $1 \leq i \leq N$ except for A) whose phase has delayed αimim at the time t while the i-th deflection mirror surface pivots at a pivot frequency ki·f (where ki is a natural number).

As shown in FIG. 21B, when the phase delay of the i-th deflection mirror surface relative to the A-th deflection mirror surface is longer than αimin, at the time tAmax that the deflection angle of the light beam deflected by the A-th deflection mirror surface (the reference deflection mirror surface) becomes maximum, the i-th deflection mirror surface securely deflects the light beam in the same direction as the direction in which the A-th deflection mirror surface deflects the light beam (i.e., the range PHB). As shown in FIG. 21C, when the phase delay of the i-th deflection mirror surface relative to the A-th deflection mirror surface is longer than αimax, the direction in which the i-th deflection mirror surface deflects the light beam is opposite to the direction in which the A-th deflection mirror surface deflects the light beam, and therefore, the phase delay must not exceed αimax.

The i-th deflection mirror surface is structured so as to pivot at the pivot frequency ki·f where ki is any desired natural number. With the phase delay of the i-th deflection mirror surface set to tAmax (=1/(4f)) therefore, the deflection angle of the light beam deflected by the i-th deflection mirror surface at the time tAmax is zero. It then follows that when the phase of the i-th deflection mirror surface is delayed by more than half the cycle of the pivot frequency of the i-th deflection mirror surface (=1/(2ki·f)), the direction in which the i-th deflection mirror surface deflects the light beam becomes the same as the direction in which the A-th deflection mirror surface deflects the light beam (i.e., the range PHB). Hence, the deflection angle Θs of the light beam leaving the N-th deflection mirror surface 951n becomes larger than the maximum deflection angle 2·ΘAmax of the light beam deflected by the A-th deflection mirror surface in the predetermined direction.

When the delay is beyond one cycle or more (=1/(ki·f)), the direction in which the i-th deflection mirror surface deflects the light beam becomes opposite to the direction in which the A-th deflection mirror surface deflects the light beam (i.e., outside the range PHB). As a result, the deflection angle Θs of the light beam leaving the N-th deflection mirror surface 951n becomes smaller than the maximum deflection angle 2·ΘAmax of the light beam deflected by the A-th deflection mirror surface in the predetermined direction.

From the above, it is seen that the phase delay αi of the i-th deflection mirror surface is within the range expressed by FORMULA 2. The symbol h/ki in FORMULA 2 denotes a generalized phase condition for each cycle, since the i-th deflection mirror surface pivots in a sinusoidal waveform.

$$\Theta i(t) = \Theta i\max \cdot \sin\{2\pi \cdot ki \cdot f(t-\alpha i)\} \frac{1}{4f} + \frac{1}{2ki \cdot f} + \frac{h}{ki} < \quad \text{FORMULA 2}$$

$$\alpha i < \frac{1}{4f} + \frac{1}{ki \cdot f} + \frac{h}{ki}$$

where t . . . time;

i . . . a natural number satisfying $1 \leq i \leq N$;

Θi(t) . . . the deflection angle of the light beam deflected by said i-th deflection mirror surface at the time t;

Θimax . . . the maximum deflection angle of the light beam deflected by said i-th deflection mirror surface f . . . the reference pivot frequency at which the reference deflection mirror surface pivots;

ki . . . the ratio (kA=1) of the pivot frequency of the i-th deflection mirror surface to the reference pivot frequency;

αi . . . the phase difference time (αA=0) of the i-th deflection mirror surface from the reference pivot frequency; and h . . . any desired integer.

Each deflection mirror surface may deflect the light beam any number of times beyond once, in which case the deflection angle Θs is expressed by the following formula:

$$\Theta s = \sum_{i=1}^{N} 2\, mi \cdot \Theta i\max \cdot \sin\{2\pi \cdot ki \cdot f(t-\alpha i)\} \quad \text{FORMULA 3}$$

where

Θs . . . the deflection angle of the light beam emitted toward the surface-to-be-scanned; and mi . . . the number of times that the light beam impinges upon the i-th deflection mirror surface.

The deflection mirror surface from which the light beam is emitted may be any one of the first through the N-th deflection mirror surfaces, of course. Even in this case, as the respective deflection mirror surfaces pivot under the pivot frequency/phase conditions expressed by FORMULA 2, it is secured that the deflection angle Θs of the light beam becomes larger than the maximum deflection angle 2·ΘAmax of the light beam deflected by the A-th deflection mirror surface (the reference deflection mirror surface) in the predetermined direction.

Further, while FIG. 19 shows that the transmission optical systems are comprised of the transmission lenses, this may be modified in various manners to the extent not deviating from the intention of this structure. For instance, various types of reflector elements may be used as the transmission optical systems, or reflector elements may be combined with transmission lenses as the transmission optical systems. In all of this embodiment and a sixth through an eighth embodiments described below, the deflection mirror surfaces operate as described above.

Specific operations in the fifth embodiment will now be described. The exposure unit 6 comprises the exposure housing 61 according to the fifth embodiment, which is similar to the third embodiment. The single laser source 62 is fixed to the exposure housing 61, permitting emission of a light beam from the single laser source 62. The single laser source 62 is electrically connected with a light source driver (not shown) of the exposure controller 102. The light source driver controls ON and OFF of the laser source 62 in accordance with image data, and the laser source 62 emits a light beam modulated in accordance with the image data.

Further, to make the light beam from the single laser source 62 scan and expose the surface (not shown) of the photosensitive member 2, the collimator lens 631, the cylindrical lens 632, the deflecting elements 85a and 85b which correspond to the "deflector" of the present invention, the scanning lens 66, the transmission optical system 87 and the return mirror 68 are disposed inside the exposure housing 61. In short, after shaped into collimated light of a proper size by the collimator lens 631, the light beam from the single laser source 62 impinges upon the cylindrical lens 632 which has power only along the sub scanning direction Y Meanwhile, the light beam transmitted by the cylindrical lens 632 is returned by the return mirror 641. As the cylindrical lens 632 is adjusted, the collimated light is imaged in the vicinity of the deflection mirror surface 851a of the deflecting element 85a in the sub scanning direction Y In this embodiment, the collimator lens 631 and the cylindrical lens 632 thus function as the beam shaper system 63 which shapes the light beam from the single laser source 62.

In addition, in the fifth embodiment, the first deflection mirror surface 851a of the deflecting element 85a is used as the reference deflection mirror surface, and the first deflection mirror surface 851a of the deflecting element 85a and the second deflection mirror surface 851b of the deflecting element 85b pivot in the same phase and at the same frequency, in a sinusoidal waveform.

After the light beam deflected by the first deflection mirror surface 851a of the deflecting element 85a which is structured so as to operate as described above impinges upon the transmission optical system 87, the transmission optical system 87 makes the second deflection mirror surface 851b of the deflecting element 85b deflect the light beam again, and the light beam impinges upon the transmission optical system 87 once again. The light beam is then returned back to the first deflection mirror surface 851a of the deflecting element 85a again. Hence, the light beam deflected by the deflecting element 85a at the first deflection angle for example is further deflected by the second deflection mirror surface 851b of the deflecting element 85b toward the transmission optical system 87 and returned to the deflecting element 85a. The light beam is thereafter deflected toward the scanning lens 66 at a deflection angle which is larger than the first deflection angle. The structures of the deflecting elements 85a and 85b and the transmission optical system 87 of the fifth embodiment are identical to the structures of the deflecting elements 85a and 85b and the transmission optical system 87 of the third embodiment, and therefore, the specific structures of these will not be described (See FIGS. 14 through 16.).

The transmission optical system 87 comprises the first transmission lens 871, which is disposed such that its front focal point approximately coincides with an approximately central position of the first deflection mirror surface 851a, and the second transmission lens 872 which is disposed such that its front focal point approximately coincides with the rear focal point of the first transmission lens 871 and its rear focal point approximately coincides with an approximately central position of the second deflection mirror surface 851b (See FIG. 14.). The light beam deflected by the deflection mirror surface 851a at the first deflection angle 2·Θ1 toward the first transmission lens 871 is guided via the first and the second transmission lenses 871 and 872 to the second deflection mirror surface 851b, and as the second deflection mirror surface 851b deflects this light beam at the deflection angle 2·Θ1+2·Θ2 toward the second transmission lens 872, the light beam is guided to the first deflection mirror surface 851a. In this manner, the first deflection mirror surface 851a deflects the light beam once again and emits toward the scanning lens 66 at the deflection angle Θs which is larger than the first deflection angle 2·Θ1 (See FIG. 22.).

The light beam impinging upon the deflecting element 85a twice and accordingly deflected is irradiated upon the surface (surface-to-be-scanned) of the photosensitive member 2 via the scanning lens 66 and the return mirror 68. As a result, the light beam scans parallel to the main scanning direction X and a line-shaped latent image extending in the main scanning direction X is formed on the surface of the photosensitive member 2.

Figure 22:
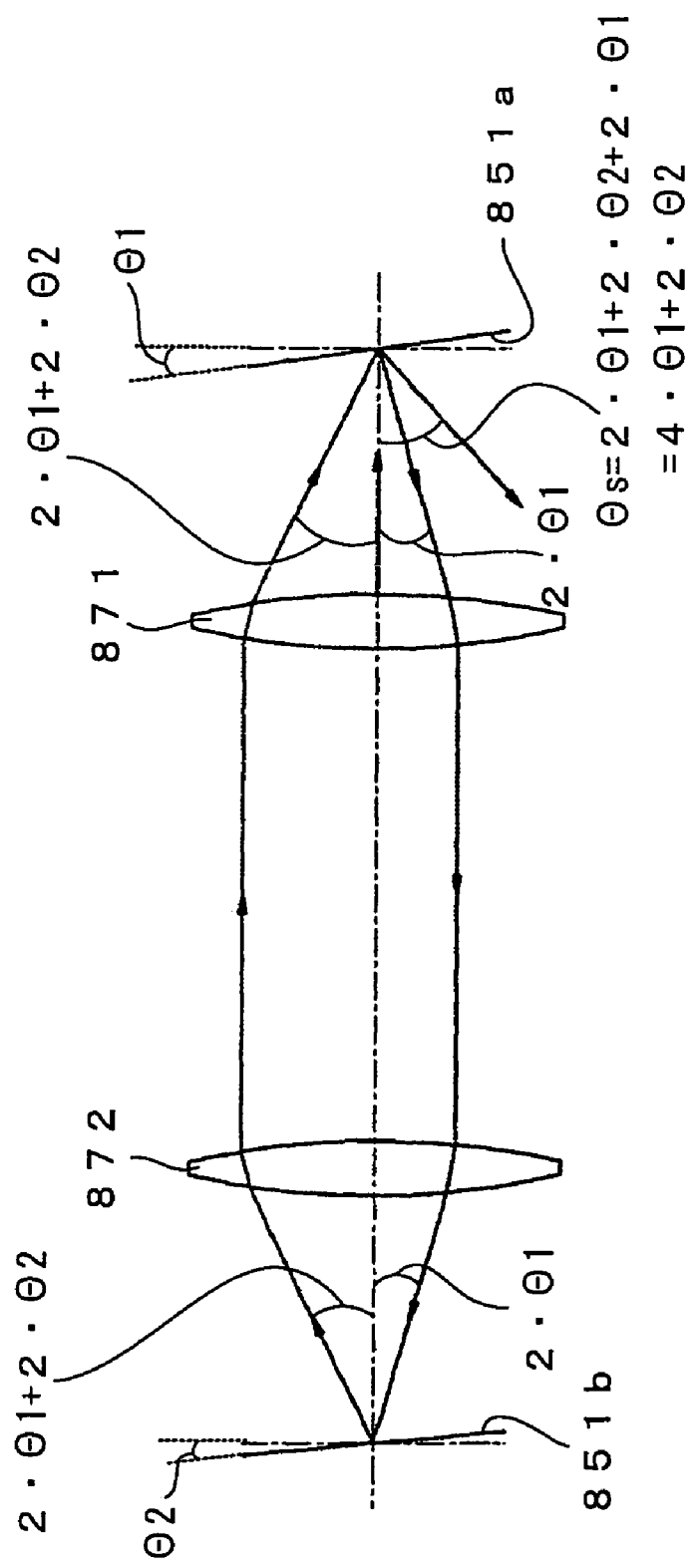
FIG. 22 is a schematic drawing which shows the deflection angle of a light beam within the exposure unit (optical scanning apparatus) which is shown in FIG. 13.

Thus, in the fifth embodiment, the deflection angle Θs of the light beam emitted from the first deflection mirror surface 851a toward the scanning lens 66 is (4·Θ1+2·Θ2) assuming that the deflection angle of the light beam deflected by the first deflection mirror surface 851a is the first deflection angle 2·Θ1 and the deflection angle of the light beam deflected by the second deflection mirror surface 851b is the second deflection angle 2·Θ2, as shown in FIG. 22. Since the first and the second deflection mirror surfaces 851a and 851b pivot in the sinusoidal waveform which is expressed by FORMULA 2, Θs corresponds to a situation that N=2 is satisfied in FORMULA 3. In other words, the first deflection mirror surface 851a serves as the reference deflection mirror surface, and the first deflection mirror surface 851a and the second deflection mirror surface 851b pivot in the same phase and at the same frequency, in the sinusoidal waveform which is expressed by FORMULA 2.

Further, in the fifth embodiment, as in the third embodiment, at the start or end of the scanning light beam, return mirrors 69a through 69c guide the scanning light beam emitted from the deflecting element 65 to the synchronization sensor 60. In short, in this embodiment, the synchronization sensor 60 functions as a horizontal synchronization reading sensor which is for obtaining a synchronizing signal in the main scanning direction X, namely, a horizontal synchronizing signal Hsync.

As described above, in this embodiment, the deflector 85 comprises the first and the second deflection mirror surfaces 851a and 851b which deflect the light beams while pivoting about the first axes (main scanning/deflection axes) which are parallel to the sub scanning direction Y which is approximately perpendicular to the main scanning direction X. The light beam deflected by the first deflection mirror surface 851a toward the transmission optical system 87 is guided by the transmission optical system 87 to the second deflection mirror surface 851b, deflected by the second deflection mirror surface 851b toward the transmission optical system 87, and guided to the first deflection mirror surface 851a by the transmission optical system 87. Deflected by the first deflection mirror surface 851a again, the light beam is emitted toward the surface (surface-to-be-scanned) of the photosensitive member 2. In this fashion, the deflection angle of the light beam emitted toward the surface of the photosensitive member becomes larger than the deflection angle of the light beam which is incident upon the transmission optical system 67. Further, where the first deflection mirror surface 851a serves as the reference deflection mirror surface, the mirror driver drives the first and the second deflection mirror surfaces 851a and 851b into the pivoting action in such a manner that when the deflection angle at which the first deflection mirror surface 851a deflects the light beam in the predetermined direction becomes the maximum deflection angle, the second deflection mirror surface deflects the light beam in the same direction as the direction in which the first deflection mirror surface 851a deflects the light beam.

Thus, when the deflection angle at which the reference deflection mirror surface (the first deflection mirror surface 851a) deflects the light beam in the predetermined direction becomes the maximum deflection angle, the second deflection mirror surface also deflects the light beam in the same predetermined direction. As the second deflection mirror surface further deflects the light beam in the same direction as the direction of deflection of the light beam by the reference deflection mirror surface when the deflection angle at which the reference deflection mirror surface deflects the light beam in the predetermined direction becomes the maximum deflection angle, it is secured that the deflection angle of the light beam emitted toward the surface-to-be-scanned exceeds the maximum deflection angle of the light beam deflected by the reference deflection mirror surface. It is thus possible to obtain a necessary deflection angle stably.

Further, in the fifth embodiment, the first deflection mirror surface 851a deflects the light beam while pivoting in the sinusoidal waveform which is expressed by i=1, k1=1, α1=0 and h=0 in FORMULA 2. Meanwhile, the second deflection mirror surface 851b deflects the light beam while pivoting in the sinusoidal waveform which is expressed by i=2, k2=1, α2=0 and h=0 in FORMULA 2. Hence, as the second deflection mirror surface further deflects the light beam in the same direction as the direction of deflection of the light beam by the reference deflection mirror surface when the deflection angle at which the reference deflection mirror surface (the first deflection mirror surface 851a) deflects the light beam becomes the maximum deflection angle, the deflection angle of the light beam emitted toward the surface-to-be-scanned becomes larger than the maximum deflection angle of the light beam deflected by the reference deflection mirror surface without fail.

Further, in the fifth embodiment, as in the third embodiment, since the first deflection mirror surface 851a is approximately conjugated relative to the surface (surface-to-be-scanned) of the photosensitive member 2 within the sub scanning plane which is approximately perpendicular to the main scanning direction X (not shown), it is possible to prevent the influence of pivoting of the first deflection mirror surface 851a, which is conjugated relative to the surface-to-be-scanned, in the sub scanning direction Y. This also reduces the size of the first deflection mirror surface 851a in the sub scanning direction Y, and hence, the size and the weight of the deflecting element 85a.

Sixth Embodiment

A sixth embodiment of the optical scanning apparatus according to the present invention will now be described. A structure used as the sixth embodiment is basically the same as the structure of the optical scanning apparatus described earlier as the first embodiment, and operations alone are partially different. Therefore, only operations unique to this embodiment will be described, while skipping the common structures and operations of the apparatus.

A major difference of the sixth embodiment from the first embodiment above is that the drive frequencies of the first and the second deflection mirror surfaces 651a and 651b are set similar to the drive frequencies of the first and the second deflection mirror surfaces 651a and 651b in the fifth embodiment above to drive the deflection mirror surfaces 651a and 651b into the pivoting action. In short, as described in detail in relation to the fifth embodiment, the drive frequencies and phases of the deflection mirror surfaces 651a and 651b are set accordingly to drive the deflection mirror surfaces 651a and 651b into the pivoting action.

In the sixth embodiment, the first deflection mirror surface 651a is used as the reference deflection mirror surface, and the first deflection mirror surface 651a and the second deflection mirror surface 651b pivot in the opposite phases to each other but at the same frequency, in the sinusoidal waveform which is expressed by FORMULA 2. It then follows from FORMULA 2 that since the second deflection mirror surface 651b is in the opposite phase, the second deflection mirror surface 651b pivots at:

$$\Theta 2(t) = -\Theta 2\max \cdot \sin\{2\pi \cdot k2 \cdot f(t-\alpha 2) - \pi\}$$

where k2=1 and α2=0. All other conditions are the same as those of the fifth embodiment.

As described above, the light beam deflected by the deflecting element 65 which is driven to pivot in the manner above is irradiated upon the surface (surface-to-be-scanned) of the photosensitive member 2 via the scanning lens 66 and the return mirror 68. As a result, the light beam scans parallel to the main scanning direction X and a line-shaped latent image extending in the main scanning direction X is formed on the surface of the photosensitive member 2.

As described above, in the sixth embodiment, since the first and the second deflection mirror surfaces 651a and 651b are driven into the pivoting action in a similar manner to that in the fifth embodiment above, similar effects to those according to the fifth embodiment are achieved.

Further, in the sixth embodiment, as in the first embodiment above, used as the transmission optical system is the convace mirror 671 which is disposed such that its reflection surface 671a faces against the first and the second deflection mirror surfaces 651a and 651b, and as the reflection surface 671a reflects toward the second deflection mirror surface 651b the light beam deflected by the first deflection mirror surface 651a, this light beam is emitted toward the surface (surface-to-be-scanned) of the photosensitive member 2 from the second deflection mirror surface 651b. In addition, the first deflection mirror surface 651a and the second deflection mirror surface 651b are driven to pivot at the same frequency but in the opposite phases and accordingly deflect the light beams. Using the convace mirror 671 as the transmission optical system 67 in this manner, the transmission optical system 67 is formed by only one convace mirror 671. Thus, the transmission optical system is fabricated in a simpler structure using less optical parts and components than in a conventional apparatus where a plurality of optical parts and components (two transmission lenses) are definitely required to form a transmission optical system. Another advantage is that since transmission lenses are not necessary, it is possible to eliminate the influence of chromatic aberration and deflect a light beam at excellent stability.

Further, in the sixth embodiment, as in the first embodiment above, the first and the second deflection mirror surfaces 651a and 651b are arranged side by side in the parallel direction to the main scanning direction X. Because of this, it is not necessary that angled light beams with respect to the main scanning plane are incident upon and leave the first and the second deflection mirror surfaces 651a and 651b. In other words, this permits disposing the optical parts and components of the optical scanning apparatus within the same main scanning plane. As a result, the apparatus is reduced in terms of size in the sub scanning direction Y, i.e., reduced in terms of thickness.

Further, in the sixth embodiment, as in the first embodiment above, the first and the second deflection mirror surfaces 651a and 651b are both approximately conjugated relative to the surface (surface-to-be-scanned) of the photosensitive member 2 in the sub scanning plane which is approximately perpendicular to the main scanning direction X. This structure prevents the influence of pivoting of the two deflection mirror surfaces 651a and 651b in the sub scanning direction Y This also reduces the sizes of the deflection mirror surfaces 651a and 651b in the sub scanning direction Y, and hence, the size and the weight of the deflecting element (deflector). In consequence, it is possible to further improve the speed at which the deflection mirror surfaces 651a and 651b are driven and further increase the scanning speed of the light beam.

Further, in the sixth embodiment, as in the first embodiment above, since the deflection mirror surfaces 651a and 651b and the support member are formed integral with each other by micro-machining one silicon substrate 652, the deflecting element (deflector) 65 is formed highly accurately, which is advantageous in improving the scannability of the light beam. In addition, the movable plates 656a and 656b are supported for free pivoting, owing to about the same spring characteristic as that of stainless steel. Therefore, it is possible to make the first and the second deflection mirror surfaces 651a and 651b pivot in a stable fashion at a high speed.

Seventh Embodiment

A seventh embodiment of the optical scanning apparatus according to the present invention will now be described. A structure used as the seventh embodiment is basically the same as the structure of the optical scanning apparatus described earlier as the second embodiment, and operations alone are partially different. Therefore, only operations unique to this embodiment will be described, while skipping the common structures and operations of the apparatus.

A major difference of the seventh embodiment from the second embodiment above is that the drive frequencies of the deflection mirror surfaces 651a and 651b are set similar to the drive frequencies of the deflection mirror surfaces in the fifth and the sixth embodiments above to drive the deflection mirror surfaces 651a and 651b into the pivoting action. In short, as described in detail in relation to the fifth embodiment, the drive frequencies and phases of the deflection mirror surfaces 651a and 651b are set accordingly to drive the deflection mirror surfaces 651a and 651b into the pivoting action. Further, in this embodiment, the first deflection mirror surface 651a and the second deflection mirror surface 651b are driven to pivot in the opposite phases to each other.

As described above, in the seventh embodiment, since the first and the second deflection mirror surfaces 651a and 651b are driven into the pivoting action in a similar manner to those in the fifth and the sixth embodiments above, similar effects to those according to the fifth and the sixth embodiments are achieved. In addition, since the first and the second deflection mirror surfaces 651a and 651b are arranged side by side in the sub scanning direction Y, the area size occupied by the deflecting element (deflector) 65 is minimum within the main scanning plane as shown in FIGS. 10 and 11, whereby the size of the apparatus within the main scanning plane is reduced and the apparatus is fabricated compact.

Eighth Embodiment

An eighth embodiment of the optical scanning apparatus according to the present invention will now be described. A major difference of the eighth embodiment from the fifth embodiment above is that electromagnetic force is used as to drive the deflection mirror surfaces 851a and 851b, and the eighth embodiment is otherwise similar to the fifth embodiment in terms of structure. A structure similar to the structure of the eighth embodiment may be applied also to the deflecting element 65 of the sixth and the seventh embodiments, to thereby drive the deflection mirror surfaces 651a and 651b into the pivoting action using electromagnetic force. In this embodiment, the structures of the deflecting elements 85a and 85b are basically the same as those of the deflecting elements 85a and 85b of the fourth embodiment, and therefore, the structures and operations of these will not be described.

Electromagnetic force, electrostatic force or the like is used to make the first deflection mirror surface 851a pivot as described above, and any desired one of these may be used. However, since each drive method has its own features, it is preferable that one of these is chosen considering the features of the respective drive methods. That is, when electromagnetic force is used as the drive force for making the first deflection mirror surface 851a pivot, it is possible to drive the first deflection mirror surface 851a into the pivoting action at a lower drive voltage than that used where electrostatic adsorption force is developed, voltage controls is therefore easy and the accuracy of positioning a scanning light beam enhances. In contrast, when electrostatic adsorption force is used as the drive force, it is not necessary to form the coil pattern, the deflecting element 85a is fabricated even smaller, and deflection/scanning becomes faster.

OTHERS

The present invention is not limited to the preferred embodiments above, but may be modified in various manners in addition to the preferred embodiments above, to the extent not deviating from the object of the invention. For instance, although the drive frequencies of the deflection mirror surfaces are set accordingly based on the resonance frequencies of the deflection mirror surfaces and the deflection mirror surfaces are driven into the pivoting action in the first through the fourth embodiments and although the drive frequencies and phases of the deflection mirror surfaces are set accordingly based on the relationships between the drive frequencies and phases of the deflection mirror surfaces and the deflection mirror surfaces are driven into the pivoting action in the fifth through the eighth embodiments, the deflection mirror surfaces may be driven into the pivoting action based on both "the resonance frequencies of the deflection mirror surfaces" and "the relationships between the drive frequencies and phases of the deflection mirror surfaces." When such a structure is used, even when the resonance frequencies of the deflection mirror surfaces somewhat change, it is possible to stabilize the deflection angle of a light beam and securely obtain a larger deflection angle than the maximum deflection angle at which the reference deflection mirror surface deflects. It is thus possible to obtain a necessary deflection angle more stably.

Although the first, the second, the sixth and the seventh embodiments above require that the first and the second deflection mirror surfaces 651a and 651b are both approximately conjugated relative to the surface (surface-to-be-scanned) of the photosensitive member 2 in the sub scanning plane, only one of the first and the second deflection mirror surfaces 651a and 651b may be approximately conjugated relative to the surface (surface-to-be-scanned) of the photosensitive member 2, with which structure it is possible to prevent the influence of pivoting of the deflection mirror surface conjugated relative to the surface-to-be-scanned in the sub scanning direction Y.

Further, although used as the deflector is the deflecting element 65 which is obtained by forming the first and the second deflection mirror surfaces 651a and 651b integral with each other in the first, the second, the sixth and the seventh embodiments above, it is needless to mention that two vibration mirrors such as galvano-mirrors each having one deflection mirror surface may be disposed side by side.

Although the first, the second, the third, the fifth, the sixth and the seventh embodiments above use electrostatic force to drive the deflection mirror surfaces 651a, 651b, 851a and 851b into the pivoting action, other drive force may be used to drive them into the pivoting action. As the other drive force, electromagnetic force described in detail in relation to the fourth and the eighth embodiments above may be used.

Further, although the first, the second, the sixth and the seventh embodiments above use the deflecting element 65 comprised of the first and the second deflection mirror surfaces 651a and 651b which are integral with each other, the deflecting elements 85a and 85b of the third, the fourth, the fifth and the eighth embodiments may be juxtaposed of course.

While the optical scanning apparatus according to the present invention is used as an exposure unit of a color image forming apparatus in the embodiments above, the present invention is not limited to this application. In other words, the optical scanning apparatus according to the present invention may be used as exposure unit of an image forming apparatus in which an electrostatic latent image is formed as a latent image carrier such as a photosensitive member is scanned with a light beam and the electrostatic latent image is developed with toner to thereby form a toner image. Of course, the optical scanning apparatus is not limitedly applied to exposure unit of an image forming apparatus but may generally be any optical scanning apparatus which makes a light beam scan a surface-to-be-scanned.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An optical scanning apparatus which comprises:
   a light source which emits a light beam;
   a first and a second deflection mirror surfaces which are disposed for free pivoting about main scanning/deflection axes which are independent of and parallel to each other; and
   a mirror driver which drives the first and the second deflection mirror surfaces and makes the first and the second deflection mirror surfaces pivot about the main scanning/deflection axes so that the light beam from the light source is deflected by the first deflection mirror surface and the deflected light beam is further deflected by the second deflection mirror surface,
   wherein the first deflection mirror surface is structured so that when driven to pivot in a first resonance frequency band including a first resonance frequency at which the deflection angle of the light beam deflected by the first deflection mirror surface becomes the largest, owing to resonance, wherein a resonance frequency band is a band of which a resonance frequency becomes 70.7% of its maximum peak, the first deflection mirror surface deflects the light beam at a larger deflection angle than when driven to pivot at a frequency outside the first resonance frequency band,
   wherein the second deflection mirror surface is structured so that when driven to pivot in a second resonance frequency band including a second resonance frequency at which the deflection angle of the light beam deflected by the second deflection mirror surface becomes the largest, owing to resonance, the second deflection mirror surface deflects the light beam at a larger deflection angle than when driven to pivot at a frequency outside the second resonance frequency band,
   wherein the second resonance frequency is higher than the first resonance frequency, and a high-frequency side of the first resonance frequency band and a low-frequency side of the second frequency band partially overlap, and
   wherein the mirror driver drives the first and the second deflection mirror surfaces and makes the first and the second deflection mirror surfaces pivot at a frequency which is higher than the first resonance frequency and lower than the second resonance frequency.

2. The optical scanning apparatus of claim 1,
   wherein the mirror driver drives the first and the second deflection mirror surfaces and makes the first and the second deflection mirror surfaces pivot at a frequency which belongs to a first drive frequency band in which the first resonance frequency band and the second resonance frequency band partially overlay each other, and
   wherein at least one of the first and the second resonance frequencies is included in the first resonance frequency band.

3. The optical scanning apparatus of claim 2, wherein the mirror driver drives the first and the second deflection mirror surfaces and makes the first and the second deflection mirror surfaces pivot at a frequency which belongs to a second drive frequency band in which a peak-to-peak band partially overlaps the first drive frequency band, the peak-to-peak band being between the first and the second resonance frequencies.

4. The optical scanning apparatus of claim 3, wherein the mirror driver drives the first and the second deflection mirror surfaces and makes the first and the second deflection mirror surfaces pivot at a frequency which is approximately at the center of the second drive frequency band.

5. The optical scanning apparatus of claim 2,
   wherein the deflection angle of the light beam deflected by the first deflection mirror surface when the first deflection mirror surface is driven to pivot in the first drive frequency band monotonously increases within a lower frequency range to the first resonance frequency in accordance with a frequency increase, but monotonously decreases within a higher frequency range to the first resonance frequency in accordance with a frequency increase, and wherein the deflection angle of the light beam deflected by the second deflection mirror surface when the second deflection mirror surface is driven to pivot in the second drive frequency band monotonously increases within a lower frequency range to the second resonance frequency in accordance with a frequency increase, but monotonously decreases within a higher frequency range to the second resonance frequency in accordance with a frequency increase.

6. The optical scanning apparatus of claim 1, further comprising:

a scan optical system which makes the light beam scan a surface-to-be-scanned in a main scanning direction which is approximately perpendicular to the main scanning/deflection axes; and a transmission optical system which guides the light beam deflected by the first deflection mirror surface toward the second deflection mirror surface, wherein the scan optical system comprises: a deflector which includes the first and the second deflection mirror surfaces and the mirror driver; and an imaging element which images the light beam on a surface-to-be-scanned, and wherein the transmission optical system comprises a concave mirror which is disposed such that its reflection surface faces against the first and the second deflection mirror surfaces, and as the concave mirror surface reflects the light beam deflected by the first deflection mirror surface toward the second deflection mirror surface, the light beam is emitted toward the surface-to-be-scanned from the second deflection mirror surface.

7. The optical scanning apparatus of claim 6, wherein the mirror driver drives the first and the second deflection mirror surfaces and makes the first and the second deflection mirror surfaces pivot in the opposite phases to each other.

8. The optical scanning apparatus of claim 6, wherein the concave mirror surface is an ellipsoidal surface which is formed by rotating an ellipsoid, whose focal points are an approximately central position of the first deflection mirror surface and an approximately central position of the second deflection mirror surface, about a virtual line which passes through the two central positions.

9. The optical scanning apparatus of claim 6, wherein the first and the second deflection mirror surfaces are arranged side by side in a direction parallel to the main scanning direction.

10. The optical scanning apparatus of claim 6, wherein the first and the second deflection mirror surfaces are arranged side by side in a sub scanning direction which is approximately perpendicular to the main scanning direction.

11. The optical scanning apparatus of claim 6, wherein at least one of the first and the second deflection mirror surfaces is approximately conjugated relative to the surface-to-be-scanned in a sub scanning plane which is approximately perpendicular to the main scanning direction.

12. The optical scanning apparatus of claim 6, wherein the deflector comprises: a first movable member which has the first deflection mirror surface; a second movable member which has the second deflection mirror surface; a support member which supports the first and the second movable members so that the first and the second movable members can freely pivot about the main scanning/deflection axes extending in a direction which is approximately perpendicular to the main scanning direction; and the mirror driver, and wherein the mirror driver makes the first and the second deflection mirror surfaces deflect the light beam while pivoting about the main scanning/deflection axes.

13. The optical scanning apparatus of claim 12, wherein the movable members and the support members are formed integral with each other by processing one substrate.

14. The optical scanning apparatus of claim 13, wherein the substrate, the movable members and the support members are made of single crystals of silicon.

15. The optical scanning apparatus of claim 12, wherein the mirror driver drives the first and the second deflection mirror surfaces and makes the first and the second deflection mirror surfaces pivot about the main scanning/deflection axes, using electrostatic adsorption force.

16. The optical scanning apparatus of claim 12, wherein the mirror driver drives the first and the second deflection mirror surfaces and makes the first and the second deflection mirror surfaces pivot about the main scanning/deflection axes, using electromagnetic force.

17. The optical scanning apparatus of claim 1, further comprising:

a scan optical system which makes the light beam scan a surface-to-be-scanned in a main scanning direction which is approximately perpendicular to the main scanning/deflection axes; and a transmission optical system which guides the light beam deflected by the first deflection mirror surface toward the second deflection mirror surface, wherein the scan optical system comprises: a deflector which includes the first and the second deflection mirror surfaces and the mirror driver; and an imaging element which images the light beam on a surface-to-be-scanned, wherein the transmission optical system comprises: a first transmission lens, which is disposed such that its front focal point approximately coincides with an approximately central position of the first deflection mirror surface; and a second transmission lens which is disposed such that its front focal point approximately coincides with the rear focal point of the first transmission lens and its rear focal point approximately coincides with an approximately central position of the second deflection mirror surface, and wherein the light beam deflected by the first deflection mirror surface toward the first transmission lens is guided to the second deflection mirror surface via the first and the second transmission lenses, the second deflection mirror surface deflects the light beam toward the second transmission lens, the light beam is guided to the first deflection mirror surface via the second and the first transmission lenses, and the light beam is deflected by the first deflection mirror surface once again and emitted toward the surface-to-be-scanned.

18. The optical scanning apparatus of claim 17, wherein the mirror driver drives the first and the second deflection mirror surfaces and makes the first and the second deflection mirror surfaces pivot in the same phase with each other.

19. The optical scanning apparatus of claim 17, wherein the deflector is comprised of two deflecting elements each comprising: a movable member which has a deflection mirror surface which deflects the light beam; a support member which supports the movable member such that the movable member can freely pivot about the main scanning/deflection axis which extends in a direction which is approximately perpendicular to the main scanning direction; and the mirror driver, and wherein the deflection mirror surface of one of the two deflecting elements is the first deflection mirror surface and the deflection mirror surface of the other deflecting element is the second deflection mirror surface.

20. The optical scanning apparatus of claim 19, wherein the movable members and the support members are formed integral with each other by processing one substrate.

21. The optical scanning apparatus of claim 20, wherein the substrate, the movable members and the support members are made of single crystals of silicon.

22. The optical scanning apparatus of claim 19, wherein the mirror driver drives the first and the second deflection mirror surfaces and makes the first and the second deflection mirror surfaces pivot about the main scanning/deflection axes, using electrostatic adsorption force.

23. The optical scanning apparatus of claim 19, wherein the mirror driver drives the first and the second deflection mirror surfaces and makes the first and the second deflection mirror surfaces pivot about the main scanning/deflection axes, using electromagnetic force.

24. An image forming apparatus, comprising:

a latent image carrier;

an exposure unit which has the same structure as the optical scanning apparatus of claim 1, makes the light beam scan a surface of the latent image carrier, and accordingly forms an electrostatic latent image on the latent image carrier; and a developer unit which develops the electrostatic latent image with toner, thereby forming a toner image.

25. The optical scanning apparatus of claim 1, wherein a frequency for driving a deflection mirror is a frequency at a center of the first resonance frequency and the second resonance frequency.

* * * * *